United States Patent [19]
Vakoc et al.

[11] Patent Number: 6,097,486
[45] Date of Patent: Aug. 1, 2000

[54] FIBER OPTIC ACOUSTIC SENSOR ARRAY BASED ON SAGNAC INTERFEROMETER

[75] Inventors: Benjamin J. Vakoc, Mountain View; Michel J. F. Digonnet, Palo Alto; Gordon S. Kino; H. John Shaw, both of Stanford, all of Calif.

[73] Assignee: The Board of Trustees of the Leland Stanford Junior University, Stanford, Calif.

[21] Appl. No.: 09/253,446

[22] Filed: Feb. 19, 1999

Related U.S. Application Data

[60] Provisional application No. 60/080,542, Apr. 3, 1998.

[51] Int. Cl.[7] ........................................ G01B 9/02
[52] U.S. Cl. .......................... 356/345; 356/352; 385/12
[58] Field of Search .................................. 356/345, 352, 356/35.5; 250/227.19; 385/12

[56] References Cited

U.S. PATENT DOCUMENTS

| | | | |
|---|---|---|---|
| 4,375,680 | 3/1983 | Cahill et al. | 367/149 |
| 4,440,498 | 4/1984 | Sheem . | |
| 4,525,818 | 7/1985 | Cielo et al. | 367/149 |
| 4,536,861 | 8/1985 | Graindorge | 367/149 |
| 4,545,253 | 10/1985 | Avicola | 367/149 |
| 4,752,132 | 6/1988 | Pavlath . | |
| 4,799,752 | 1/1989 | Carome | 367/149 |
| 5,373,487 | 12/1994 | Crawford | 367/149 |
| 5,589,937 | 12/1996 | Brininstool | 356/345 |
| 5,636,021 | 6/1997 | Udd . | |
| 5,636,022 | 6/1997 | Priest . | |
| 5,694,114 | 12/1997 | Udd . | |
| 5,866,898 | 2/1999 | Hodgson et al. | 250/227.14 |

OTHER PUBLICATIONS

Sang K. Sheem, Fiber–optic gyroscope with [3x3] directional coupler, *Applied Physics Letters*, vol. 37, No. 10, Nov. 15, 1980, pp. 869–871.

K. Böhm, et al., Low–Drift Fibre Gyro Using a Superluminescent Diode, *Electronics Letters*, vol. 17, No. 10, May 14th 1981, pp. 352–353.

R.A. Bergh, et al., Compensation of the optical Kerr effect in fiber–optic gyroscopes, *Optics Letters*, vol. 7, No. 6, Jun. 1982, pp. 282–284.

R.A. Bergh, et al., Source statistics and the Kerr effect in fiber–optic gyroscopes, *Optics Letters*, vol. 7, No. 11, Nov. 1982, pp. 563–565.

B. Culshaw, et al., Fibre optic gyroscopes, *Journal of Physics E (Scientific Instruments)*, vol. 16, No. 1, 1983, pp. 5–15.

E. Udd, Fiber–optic acoustic sensor based on the Sagnac interferometer, *Proceedings of the SPIE The International Society for Optical Engineering*, vol. 425, 1983, pp. 90–91.

Robert J. Urick, The noise background of the sea: ambient noise level, *Principles of Underwater Sound*, 3rd Ed., Chapter 7, McGraw–Hill, 1983, pp. 202–236.

N.J. Frigo, et al., Optical Kerr effect in fiber gyroscopes: effects of nonmonochromatic sources, *Optics Letters*, vol. 8, No. 2, Feb. 1983, pp. 119–121.

J.A. Bucaro, et al., Optical fibre sensor coatings, *Optical Fiber Sensors, Proceedings of the NATO Advanced Study Institute*, 1986, pp. 321–338.

(List continued on next page.)

*Primary Examiner*—Robert H. Kim
*Attorney, Agent, or Firm*—Knobbe, Martens, Olson & Bear, LLP

[57] ABSTRACT

A fiber optic acoustic sensor array is based upon a Sagnac interferometer rather than being based upon Mach-Zehnder interferometers as in known acoustic sensor arrays. The fiber optic acoustic sensor array is used to detect acoustic waves in water. By basing the sensor array on the Sagnac interferometer rather than on a Mach-Zehnder interferometer, the sensor array has a stable bias point, has reduced phase noise, has a larger dynamic range, and allows a broadband signal source to be used rather than requiring a more expensive narrowline laser. A large number of acoustic sensors can be multiplexed into the architecture of the Sagnac interferometer.

46 Claims, 16 Drawing Sheets

OTHER PUBLICATIONS

Moslehi, Analysis of Optical Phase Noise in Fiber–Optic Systems Employing a Laser Source with Arbitrary Coherence Time, *Journal of Lightwave Technology*, vol. LT–4, No. 9, Sep. 1986, pp. 1334–1351.

Anthony Dandridge, et al., Multiplexing of Interferometric Sensors Using Phase Carrier Techniques, *Journal of Lightwave Technology*, vol. LT–5, No. 7, Jul. 1987, pp. 947–952.

Kjell Kråkenes, et al., Sagnac interferometer for underwater sound detection: noise properties, *Optics Letters*, vol. 14, No. 20, Oct. 15, 1989, pp. 1152–1145.

H.S. Al–Raweshidy, et al., Spread spectrum technique for passive multiplexing of interferometric optical fibre sensors, *SPIE*, vol. 1314 Fibre Optics '90, pp. 342–347.

H. Poisel, et al., Low–cost fibre–optic gyroscope, *Electronics Letters*, vol. 26, No. 1, $4^{th}$ Jan. 1990, pp. 69–70.

J.T. Kringlebotn, et al., Sagnac Interferometer Including A Recirculating Ring With An Erbium–doped Fibre Amplifier, *OFS '92 Conference Proceedings*, pp. 6–9.

S. F. Collins, et al., A Multiplexing Scheme For Optical Fibre Interferometric Sensors Using An FMCW Generated Carrier, *OFS '92 Conference Proceedings*, pp. 209–211.

A.D. Kersey, et al., Code–division Multiplexed Interferometric Array With Phase Noise Reduction And Low Crosstalk, *OFS '92 Conference Proceedings*, pp. 266–269.

William K. Burns, et al., Fiber–Optic Gyroscopes with Depolarized Light, *Journal of Lightwave Technology*, vol. 10, No. 7, Jul. 1992, pp. 992–999.

C.C. Wang, et al., Very high responsivity fiber optic hydrophones for commercial applications, *Proceedings of the SPIE—The International Society for Optical Engineering*, vol. 2360, 1994, pp. 360–363.

Sverre Knudsen, et al., An Ultrasonic Fiber–Optic Hydrophone Incorporating a Push–Pull Transducer in a Sagnac Interferometer, *Journal of Lightwave Technology*, vol. 12, No. 9, Sep. 1994, pp. 1696–1700.

Sverre Knudsen, et al., Measurements of Fundamental Thermal Induced Phase Fluctuations in the Fiber of a Sagnac Interferometer, *IEEE Photonics Technology Letters*, vol. 7, No. 1, 1995, pp. 90–93.

Kjell Kråkenes, et al., Comparison of Fiber–Optic Sagnac and Mach–Zehnder Interferometers with Respect to Thermal Processes in Fiber, *Journal of Lightwave Technology*, vol. 13, No. 4, Apr. 1995, pp. 682–686.

Sverre Knudsen, Ambient and Optical Noise in Fiber–Optic Interferometric Acoustic Sensors, *Fiber–Optic Sensors Based on the Michelson and Sagnac Interferometers: Responsivity and Noise Properties*, Thesis, Chapter 3, Norwegian University of Science and Technology, 1996, pp. 37–40.

M.J.F. Digonnet, et al., Resonantly Enhanced Nonlinearity in Doped Fibers for Low–Power All–Optical Switching: A Review, *Optical Fiber Technology*, vol. 3, No. 1, Jan. 1997, pp. 44–64.

Jefferson L. Wagener; et al., Novel Fiber Sensor Arrays Using Erbium–Doped Fiber Amplifiers, *Journal of Lightwave Technology*, vol. 15, No. 9, Sep. 1997, pp. 1681–1688.

C.W. Hodgson, et al., Large–scale interferometric fiber sensor arrays with multiple optical amplifiers, *Optics Letters*, vol. 22, No. 21, Nov. 21, 1997, pp. 1651–1653.

Craig W. Hodgson, et al., Optimization of Large–Scale Fiber Sensor Arrays Incorporating Multiple Optical Amplifiers–Part 1: Signal–to–Noise Ratio, *Journal of Lightwave Technology*, vol. 16, No. 2, Feb. 1998, pp. 218–223.

Craig W. Hodgson, et al., Optimization of Large–Scale Fiber Sensor Arrays Incorporating Multiple Optical Amplifiers–Part 11: Pump Power, *Journal of Lightwave Technology*, vol. 16, No. 2, Feb. 1998, pp. 224–231.

FIBER OPTIC ACOUSTIC SENSOR ARRAY BASED ON SAGNAC INTERFEROMETER

RELATED APPLICATION

This application claims the benefit of priority under 35 U.S.C. § 119(e) of U.S. Provisional Application No. 60/080,542, filed on Apr. 3, 1998.

BACKGROUND OF THE INVENTION

1. Field of the Invention

The present invention is in the field of fiber optic acoustic sensor arrays wherein light is propagated in the arrays and the effects of acoustic signals on the light returning from the arrays are analyzed to determine the characteristics of the acoustic signals.

2. Description of the Related Art

Fiber optic based acoustic sensors are promising alternatives to conventional electronic sensors. Included among their advantages are a high sensitivity, large dynamic range, light weight, and compact size. The ability to easily multiplex a large number of fiber optic sensors onto common busses also makes fiber optic sensors attractive for large-scale arrays. The recent successful incorporation of multiple small-gain erbium doped fiber amplifiers (EDFAs) into a fiber optic sensor array to increase the number of sensors that can be supported by a single fiber pair has made large-scale fiber optic sensor arrays even more competitive.

For acoustic detection, the fiber optic sensor of choice has been the Mach-Zehnder interferometric sensor. In any interferometric sensor, phase modulation is mapped into an intensity modulation through a raised cosine function. Because of this nonlinear transfer friction, a sinusoidal phase modulation will generate higher order harmonics. An interferometer biased at quadrature (interfering beams $\pi/2$ out of phase) has a maximized response at the first order harmonic and a minimized response at the second order harmonic. For this reason, quadrature is the preferred bias point. As the bias point drifts away from quadrature (for example, due to external temperature changes), the response at the first order harmonic decreases and the response at the second order harmonic increases. When the interferometer is biased at 0 or $\pi$ out of phase, the first order harmonic disappears completely. This decreased response at the first order harmonic (resulting from the bias points away from quadrature) is referred to as signal fading.

Because Mach-Zehnder interferometric sensors have an unstable bias point, they are especially susceptible to the signal fading problem just mentioned. In order to overcome signal fading, a demodulation of the returned signal is required. The typical demodulation technique is the Phase-Generated Carrier (PGC) scheme, which requires a path-mismatched Mach-Zehnder interferometric sensor. (See, for example, Anthony Dandridge, et al., Multiplexing of Interferometric Sensors Using Phase Carrier Techniques, *Journal of Lightwave Technology*, Vol. LT-5, No. 7, July 1987, pp. 947–952.) This path imbalance also causes the conversion of laser phase noise to intensity noise, which limits the performance of the Mach-Zehnder interferometric sensor arrays at low frequencies and places stringent requirements on the linewidth of the source. This narrow linewidth requirement has slowed the development of amplified Mach-Zehnder interferometric sensor arrays at 1.55 μm.

The Sagnac interferometer has found widespread use in the fiber optic gyroscopes. (See, for example, B. Culshaw, et al., Fiber optic gyroscopes, *Journal of Physics E (Scientific Instruments)*, Vol. 16, No. 1, 1983, pp. 5–15.) It has been proposed that the Sagnac interferometer could be used to detect acoustic waves. (See, for example. E. Udd, Fiber-optic acoustic sensor based on the Sagnac interferometer, *Proceedings of the SPIE-The International Society for Optical Engineering*, Vol. 425, 1983, pp. 90–91; Kjell Kråkenes, et al., Sagnac interferometer for underwater sound detection: noise properties, *OPTICS LETTERS*, Vol. 14, No. 20, Oct. 15, 1989, pp. 1152–1145; and Sverre Knudsen, et al., An Ultrasonic Fiber-Optic Hydrophone Incorporating a Push-Pull Transducer in a Sagnac Interferometer, *JOURNAL OF LIGHTWAVE TECHNOLOGY*, Vol. 12, No. 9, September 1994, pp. 1696–1700.) Because of its common-path design, the Sagnac interferometer is reciprocal and therefore has a stable bias point, which eliminates signal fading and prevents the conversion of source phase noise into intensity noise. Therefore, the Sagnac interferometer is immune to the phase noise which limits the Mach-Zehnder interferometric sensors at low frequencies.

SUMMARY OF THE INVENTION

One aspect of the present invention is an acoustic sensor system which comprises a source of light. A coupler receives the light from the source, couples a first portion of the light to a first coupler port and couples a second portion of the light to a second coupler port. An interferometric loop has a first end coupled to the first coupler port to receive the first portion of the light and has a second end coupled to the second coupler port to receive the second portion of the light. The interferometric loop propagates the first portion of the light in a first direction to the second coupler port and propagates the second portion of the light in a second direction opposite the first direction to the first coupler port. The interferometric loop comprises a delay portion. The delay portion has a first end proximate to the first end of the interferometric loop and has a second end. The delay portion provides a time delay for light passing through the delay portion from the first end of the delay portion to the second end of the delay portion and for light passing through the (delay portion from the second end of the delay portion to the first end of the delay portion. An array has a first end coupled to the second end of the delay portion and has a second end coupled to the second end of the loop. The array comprises at least a first acoustic sensor and a second acoustic sensor coupled between the first end of the array and the second end of the array. The second acoustic sensor is disposed farther from the second end of the delay portion and farther from the second end of the loop than the first acoustic sensor to cause the second acoustic sensor to receive light at a different time than the first acoustic sensor. The first acoustic sensor and the second acoustic sensor are responsive to an impinging acoustic signal to modulate light passing therethrough in the first and second directions. At least one detector receives light returned to the coupler from the interferometric loop. The detector detects light modulated by the first acoustic sensor at a first time and detects light modulated by the second acoustic sensor at a second time after the first time. The detector generates a detector output signal. For each sensor, the light pulses that propagate through the sensor in opposite directions do so at different times. Because the acoustic signal to be detected changes during the time delay introduced by the loop, the two optical signals propagating in opposite directions through each sensor experience different phase shifts caused by the acoustic signal. When the optical signals are combined at the loop coupler, the differential phase shift produces an amplitude modulation which is detected by the detector.

In certain embodiments, the acoustic sensor system further includes a second delay portion. The second delay portion is coupled to the interferometric loop such that only a portion of the light propagates through the second delay portion. The second delay portion causes each of the first and second sensors to propagate light delayed by only the first delay portion and also to propagate light delayed by both the first delay portion and the second delay portion. The detector thereby receives at least two pairs of interfering signals from each of the first and second sensors.

In particular embodiments, the acoustic sensor system further includes a plurality of amplifiers interposed in the array to compensate for losses caused by splitting the light between the first and second sensors.

In certain embodiments, the light modulated by the first acoustic sensor is separated from the light modulated by the second acoustic sensor by time division multiplexing.

In alternative embodiments, the light is modulated at the source to provide frequency division multiplexing of the returned signals. In such embodiments, the system further includes a generator which generates a chirped frequency. An intensity modulator modulates the light from the light source with the chirped frequency. An electronic delay receives the chirped frequency and generates a delayed chirp frequency. A mixer mixes the detector output signal and the delayed chirped frequency to produce a respective beat frequency corresponding to each of the first and second acoustic sensors. Each beat frequency has respective sidebands corresponding to a respective acoustic signal detected by the respective first and second acoustic sensors.

In a farther alternative embodiment, the return signals are multiplexed by code division multiplexing. In such an alternative embodiment, the acoustic sensor system further includes a code generator which generates a digital code. An intensity modulator modulates the light from the light source with the digital code. An electronic delay applies a selected delay to the digital code to generate a delayed digital code. A correlator correlates the detector output signal and the digital code to produce a demultiplexed signal corresponding to an acoustic signal sensed by a selected one of the first and second acoustic sensors. The selected one of the first and second sensors is selected by the selected delay. By changing the electronic delay, each of the sensor signals can be demultiplexed sequentially.

The present invention may advantageously include a depolarizer in the loop to depolarize tie light propagating therein to assure that light is propagating in both polarization states through the sensors.

Another aspect of the present invention is a Sagnac interferometric sensing system which comprises a first Sagnac interferometer. The first Sagnac interferometer comprises a source of light which generates light as a plurality of spaced-apart pulses of light. A coupler couples the pulses of light to a first coupler port and a second coupler port. An optical path couples light from the first coupler port to the second coupler port and from the second coupler port to the first coupler port. The optical path comprises a delay portion proximate to the first coupler port. The delay portion provides a time delay for light propagating through the delay portion from a first end of the delay portion to a second end of the delay portion and also provides the time delay for light propagating through the delay portion from the second end of the delay portion to the first end of the delay portion. A first acoustic sensor is coupled between the second end of the delay portion and the second port of the coupler. The first acoustic sensor propagates a first light signal from the second end of the delay portion to the second coupler port and propagates a second light signal from the second coupler port to the second end of the delay portion. The first acoustic sensor is responsive to an impinging acoustic signal to modulate the first and second light signals. The second light signal is delayed in the delay portion to cause the second light signal to arrive at the first port of the coupler at substantially the same time as the second light signal arrives at the second port of the coupler. The first light signal and the second light signal interfere at the coupler to generate a first interferometer output signal. A detector is coupled to receive the first interferometer output signal. A second Sagnac interferometer comprises the source of light, the coupler, the optical path, the delay portion, the detector, and a second acoustic sensor. The second acoustic sensor is coupled between the second end of the delay portion and the second port of the coupler. The second acoustic sensor is displaced from the second end of the delay portion and from the second port of the coupler to cause the second acoustic sensor to couple a third light signal from the second end of the delay portion to the second port of the coupler after the first light signal is coupled to the second port of the coupler and to cause the acoustic sensor to couple a fourth light signal from the second port of the coupler to the second end of the delay portion after the second light signal is coupled to the second end of the delay portion. The fourth light signal is delayed in the delay portion to arrive at the first port of the coupler at substantially the same time as the third light signal arrives at the second port of the coupler. The third and fourth light signal interfere in the coupler to generate a second interferometric output signal which is detected by the detector after the first interferometric light signal is detected by the detector.

Another aspect of the present invention is a sensing apparatus which comprises a source of light pulses and an optical coupler which receives the light pulses and couples the light pulses to a first coupler port and a second coupler port. An optical fiber loop comprises a first end coupled to receive light from the first coupler port and a second end coupled to receive light from the second coupler port. The light from the first coupler port propagates in a first direction in the loop to the second coupler port. The light from the second coupler port propagates in a second direction in the loop to the first coupler port. A sensor array comprises a plurality of sensors. Each sensor receives a respective portion of the light propagating in the first direction in the loop and a respective portion of the light propagating in the second direction in the loop. Each of the sensors has a different optical path length such that the respective portions of light propagate through a first one of the sensors before the respective portions of light propagate through a second one of the sensors. The sensor array is positioned optically closer to the first end of the loop than to the second end of the loop to cause light propagating in the first direction to be delayed in the loop and then propagate through the sensor array and to cause light propagating in the second direction to propagate through the sensor array and then be delayed in the loop. Thus, the light pulses that propagate through a given sensor in opposite directions do so at different times. Because the acoustic signal to be detected changes during the time delay introduced by the loop, the two optical signals experience different phase shifts caused by the acoustic signal. When the optical signals are combined at the loop coupler, the differential phase shift produces an amplitude modulation which is detected by the detector.

Another aspect of the present invention is a method of sensing a parameter. In accordance with the method, light is propagated from a source of light through a loop such that respective portions of the light counterpropagate in first and second directions in the loop. The light propagating in the loop passes through at least first and second sensors which are responsive to the parameter being sensed to modulate the light passing therethrough. The first and second sensors have different optical path lengths such that light passing through the second sensor is delayed with respect to light passing through the first sensor. The light propagating in the loop in the first direction is delayed before passing through the first and second sensors. The fight propagating in the loop in the second direction is delayed after passing through the first and second sensors. The light propagating in the first and second directions is interfered in a coupler to generate a first output signal responsive to light passing through the first sensor in the first and second directions and to generate a second output signal responsive to light passing through the second sensor in the first and second directions. The second output signal is delayed with respect to the first output signal.

Another aspect of the present invention is a sensing apparatus which comprises a coupler which receives light from an optical source and which couples first and second portions of the light to first and second coupler ports. An optical loop is connected between the first and second coupler ports to propagate light from the first coupler port to the second coupler port through the loop in a first direction and to propagate light from the second coupler port to the first coupler port in a second direction. The light propagating in the first and second directions is combined in the coupler. A sensor array comprises at least first and second sensors which sense a parameter. The first and second sensors have respective first and second optical paths. The first optical path through the first sensor is optically shorter than the second optical path through the second sensor. An optical delay portion is positioned in the loop between the sensor array and the first coupler port to cause light propagating from the first coupler port in the first direction to be delayed by the optical delay portion before reaching the sensor array and to cause light propagating from the second coupler port in the second direction to be delayed by the optical delay portion after passing through the sensor array.

Another aspect of the present invention is a fiber optic acoustic sensor array based upon a Sagnac interferometer rather than being based upon Mach-Zehnder interferometers as in known acoustic sensor arrays. The fiber optic acoustic sensor array is used to detect acoustic waves in water. By basing the sensor array on the Sagnac interferometer rather than on a Mach-Zehnder interferometer, the sensor array has a stable bias point, has reduced phase noise, and allows a broadband signal source to be used rather than requiring a more extensive narrowline laser. A large number of acoustic sensors can be multiplexed into the architecture of the Sagnac interferometer.

BRIEF DESCRIPTION OF THE DRAWINGS

The present invention will be described below in connection with the accompanying drawing figures in which.

DETAILED DESCRIPTION OF THE PREFERRED EMBODIMENTS

The present invention is described below in connection with an array of acoustic sensors (e.g., hydrophones) in a Sagnac loop. Before describing the preferred embodiments, a brief review of the operation of a single loop Sagnac acoustic sensor is provided.

Single Loop Sagnac Acoustic Sensor

Figure 1:
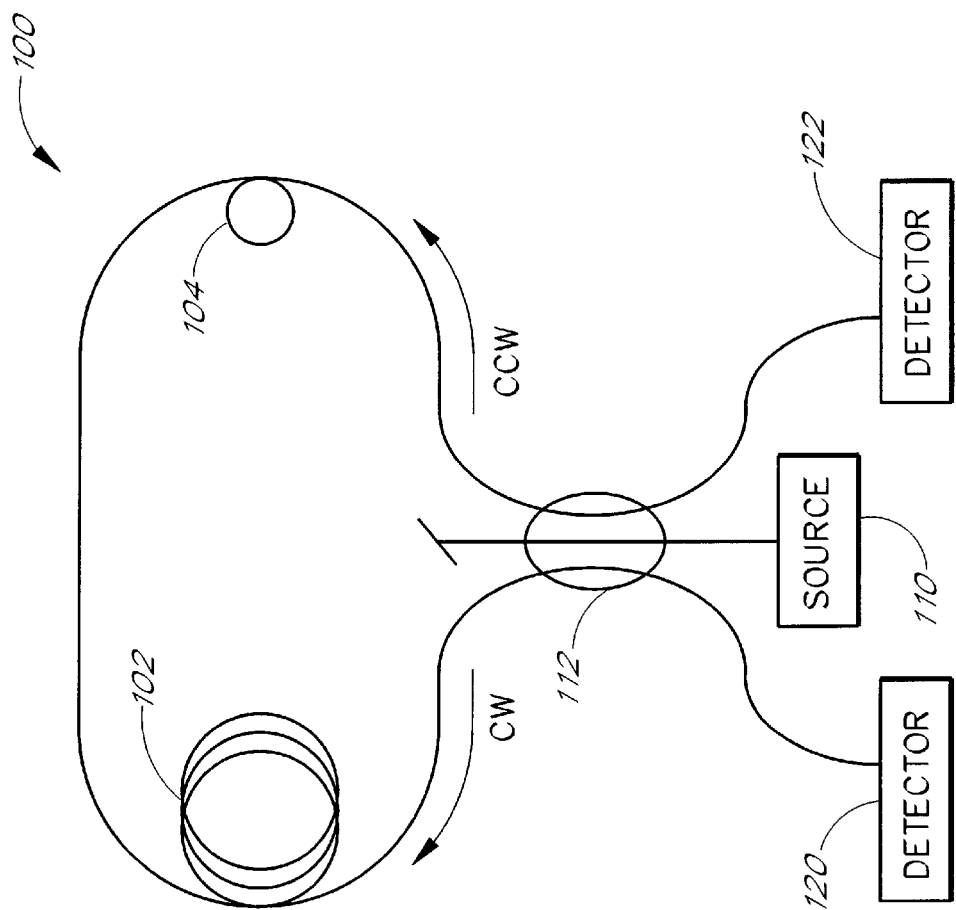
FIG. 1 illustrates an exemplary Sagnac interferometer having a single sensing loop.

A simple Sagnac-based acoustic sensor 100 is shown in FIG. 1. The Sagnac loop is divided into two portions, a delay loop 102 and a hydrophone 104. The delay loop 102 is simply a large length of fiber, typically greater than 1 km. The hydrophone 104 is a portion of fiber in which an acoustic wave is transformed into a phase modulation of an optical signal propagating through the fiber. A high responsivity to acoustic waves is typically accomplished by selecting optimized coatings for the section of fiber in the hydrophone 104, and wrapping the fiber around a mandrel of suitable composition. (See, for example, J. A. Bucaro, et al., Optical fibre sensor coatings, *Optical Fiber Sensors, Proceedings of the NATO Advanced Study Institute,* 1986, pp. 321–338.) The length of fiber wrapped around the hydrophone 104 is typically 10 meters to 100 meters. Light from a source 110, such as, for example, a superfluorescent fiber source (SFS), is split into clockwise (CW) and counter-clockwise (CCW) beams by a 3×3 coupler 112. The operation of the 3×3 coupler 112 is well-known and is described, for example, in Sang K. Sheem, Fiber-optic gyroscope with [3×3] directional coupler, *Applied Physics Letters,* Vol. 37, No. 10, 15 Nov. 15, 1980, pp 869–871.

Although described herein as using a 3×3 coupler 112, other couplers (e.g., a 2×2 coupler, a 4×4 coupler, etc.) can be used with alternative embodiments of the present invention. For example, to use a 2×2 coupler, both ports of one side are used to create the Sagnac interferometer. One port of the other side is a detection port. The remaining port is used to launch light into the array and can also be used as a detection port if a coupler or circulator is employed (in a similar manner as is done with fiber optic gyroscopes). In general, any n×m coupler can be employed by using two ports of one side of the coupler to create the Sagnac interferometer and using the ports on the other side of the coupler as detection ports, launching ports, or both.

After splitting, the CW beam travels through the delay loop 102 first and then through the hydrophone 104, while the CCW beam travels through the hydrophone 104 first and then through the delay loop 102. During a time delay $T_{delay}$ between a time when the CW beam travels through the hydrophone 104 and a time when the CCW beam travels through the hydrophone 104, the acoustic signal and likewise the acoustically induced phase modulation in the hydrophone 104 changes. This change in phase modulation is mapped into a phase difference between the counter-propagating beams, which is converted into an intensity modulation when the beams recombine at the 3×3 coupler 112. This intensity modulation is then detected by a first detector 120 and a second detector 122 or by only one of the two detectors.

More explicitly, if an acoustic signal induces a phase modulation $\phi_h \cos(\Omega t)$ in the fiber of the hydrophone 104, the resulting phase modulation between the interfering beams at the hydrophone 104, $\phi_{int}(t)$, is given by:

$$\phi_{int}(t) = \phi_h \cos(\Omega t) - \phi_h \cos(\Omega(t + T_{delay})) \quad (1)$$

$$= 2\phi_h \sin\left(\frac{\Omega \cdot T_{delay}}{2}\right) \sin\left(\Omega t + \frac{\Omega \cdot T_{delay}}{2}\right)$$

where $T_{delay}$ is the travel time through the delay loop. Thus, $\phi_{int}(t)$ is a function of the hydrophone modulation $\phi_h$ and the product of the acoustic modulation frequency, $\Omega$, with the loop) delay, $T_{delay}$. This differs from a Mach-Zehnder interferometric sensor in which $\phi_{int}(t)$ is a function of only the hydrophone modulation $\phi_h$. Maximum sensitivity is achieved in the Sagnac loop acoustic sensor when the product of the acoustic frequency, $\Omega$, and the time delay, $T_{delay}$, is an odd multiple of $\pi$ (maximum value of the first sine term in Equation 1). The acoustic frequency which makes this product $\pi$ is called the proper frequency of the loop, which is the lowest frequency at which maximum sensitivity is achieved. Most underwater sensing applications are concerned with the detection of acoustic frequencies below 10 kHz. For the proper loop frequency to be less than 10 kHz, a delay time of at least 50 microseconds and therefore a delay loop length of at least 10 km is required. Thus, the Sagnac acoustic sensor 100 requires a large amount of fiber for the detection of low acoustic frequencies (<10 kHz).

The common-path design inherent to the Sagnac interferometer has many advantages over a Mach-Zehnder interferometer in addition to the stable bias point and elimination of phase noise already mentioned. A Sagnac interferometer allows the use of a short-coherence length, broadband source, such as a superfluorescent fiber source (SFS), an example of an amplified spontaneous emission (ASE) source. Such sources are inexpensive and can readily provide high powers. It has been shown that the use of the 3×3 coupler passively biases the Sagnac acoustic sensor near quadrature. (See, Sang K. Sheem, Fiber-optic gyroscope with [3×3] directional coupler, *Applied Physics Letters,* Vol. 37, No. 10, Nov. 15, 1980, pp. 868–871; and H. Poisel, et al., Low-cost fiber-optic gyroscope, *Electronics Letters,* Vol. 26, No. 1, Jan. 4, 1990, pp. 69–70.) By subtracting the signals from the two detection ports of the 3×3 coupler, the source excess noise, which is the limiting noise source of SFS sources, can be subtracted while phase-modulation induced intensity variations due to the hydrophone are added. This allows a Sagnac interferometer to approach near shot-noise limited performance. (See, Kjell Kråkenes, et al., Sagnac interferometer for underwater sound detection: noise properties, *OPTICS LETTERS,* Vol. 14, No. Oct. 15, 1989, pp. 1152–1145.)

Previous work on Sagnac-based acoustic sensors has been limited to a single sensor configuration. Because of the inherent advantages of the Sagnac interferometer, Applicants have determined that it is desirable to replace the Mach-Zehnder interferometric sensors in a large-scale array with Sagnac based sensors. Each Sagnac sensor 100 discussed above requires many kilometers of fiber, making the insertion of numerous such sensors into a large-scale array impractical. Research into using recirculating delay loops to reduce the fiber length requirement has produced sensors which use significantly less fiber but suffer from high noise due to the incorporation of EDFAs within the recirculating loop. (See, for example, J. T. Kringlebotn, et al., Sagnac Interferometer Including A Recirculating Ring With An Erbium-doped Fibre Amplifier, *OFS '92 Conference Proceedings,* pp. 6–9.) A novel approach for decreasing the fiber required is described below.

Novel Sensor Array Based on the Sagnac Interferometer

Figure 2:
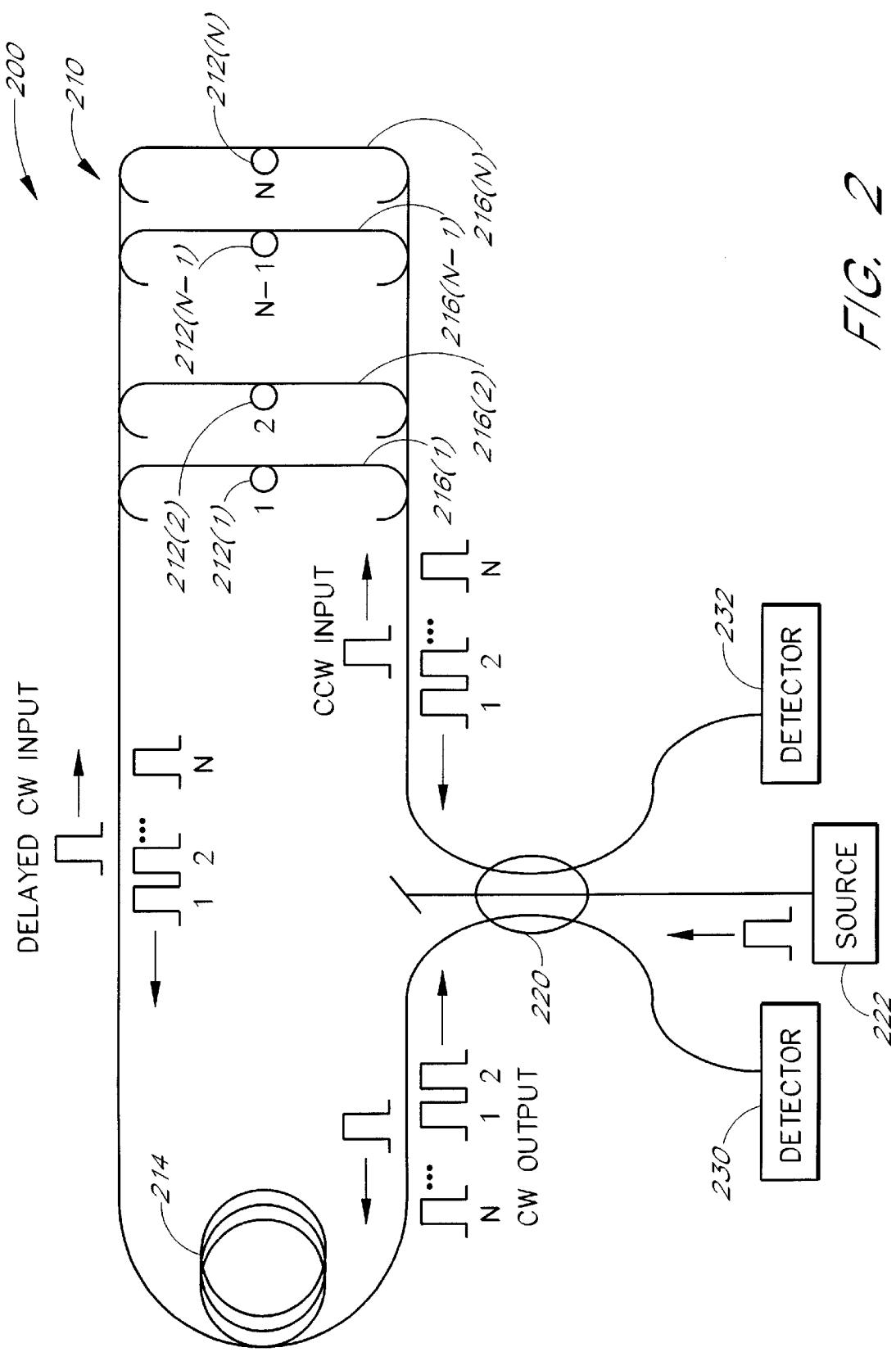
FIG. 2 illustrates a Sagnac sensor array in accordance with the present invention wherein each rung of a sensor array forms an additional Sagnac interferometer.

As set forth below, Applicants have discovered a novel system which reduces the amount of fiber needed for a Sagnac-based large scale array by multiplexing multiple sensors onto the same delay loop, producing a practical Sagnac sensor array (SSA). As illustrated in FIG. 2, a Sagnac sensor array 200 in accordance with the present invention includes an array 210 of hydrophones 212(*i*) in a ladder configuration which are attached to a single delay loop 214. For example, FIG. 2 shows a Sagnac sensor array 210 having N hydrophones 212(1), 212(2) ... 212(N) in respective rungs 216(1), 216(2) ... 216(N). Each rung 216(*i*) in the Sagnac sensor array 210 comprises a single fiber wrapped around a respective hydrophone 212(*i*). Every path from a 3×3 coupler 220 through the delay loop 214 and array 210 and back to the coupler 220 comprises a separate Sagnac interferometer. Therefore, for an array of N sensors 212, there are N separate Sagnac interferometers, each of which behaves like the single loop Sagnac sensor 100 shown in FIG. 1. Each Sagnac interferometer measures the acoustic signal at a separate point in space, i.e., the location of the hydrophone 212(*i*). For example, the Sagnac interferometer comprising the delay loop 214 and the rung 216(1) measures the acoustic signal at hydrophone 212(1). In addition, each Sagnac interferometer also picks up acoustic signals (e.g., noise) elsewhere in the loop, which noise is advantageously reduced, as will be discussed below.

The Sagnac sensor array 200 is easiest understood in a time-division multiplexed (TDM) configuration (non-TDM schemes are discussed later). A source 222 (which may advantageously comprise a conventional pulsed source or may comprise a cw source with an external modulator) generates a light pulse which enters the Sagnac loop via a third port of the coupler 220 and propagates in both the CW and CCW directions as indicated in FIG. 2. Upon reaching the array 210, the CCW pulse is split into a train of N separate pulses. At this point, the CW input pulse has not yet reached the array 210 and is still a single pulse. When the CW pulse reaches the array 210, it also is split into a train of N pulses. Each pulse in the CW train returns to the 3×3 coupler 220 after traveling through a respective rung 216($i$) and interferes with the pulse in the CCW train which has traveled the same rung 216($i$) in the opposite direction. Thus, N pulses are detected by a first detector 230 and a second detector 232, and each pulse comprises the CW and CCW pulses of one of the N Sagnac loops (i.e., the two pulses which have traveled in opposite directions through the same respective rung 216($i$)). Because the pulses which travel through different combinations of rungs do not travel identical optical paths, such pulses are not coincident in time at the coupler 220, and thus do not interfere with each other at the coupler 220. The pulse widths should be smaller than the differential delay between adjacent sensors so that the pulses from adjacent sensors do not overlap.

Figure 3:
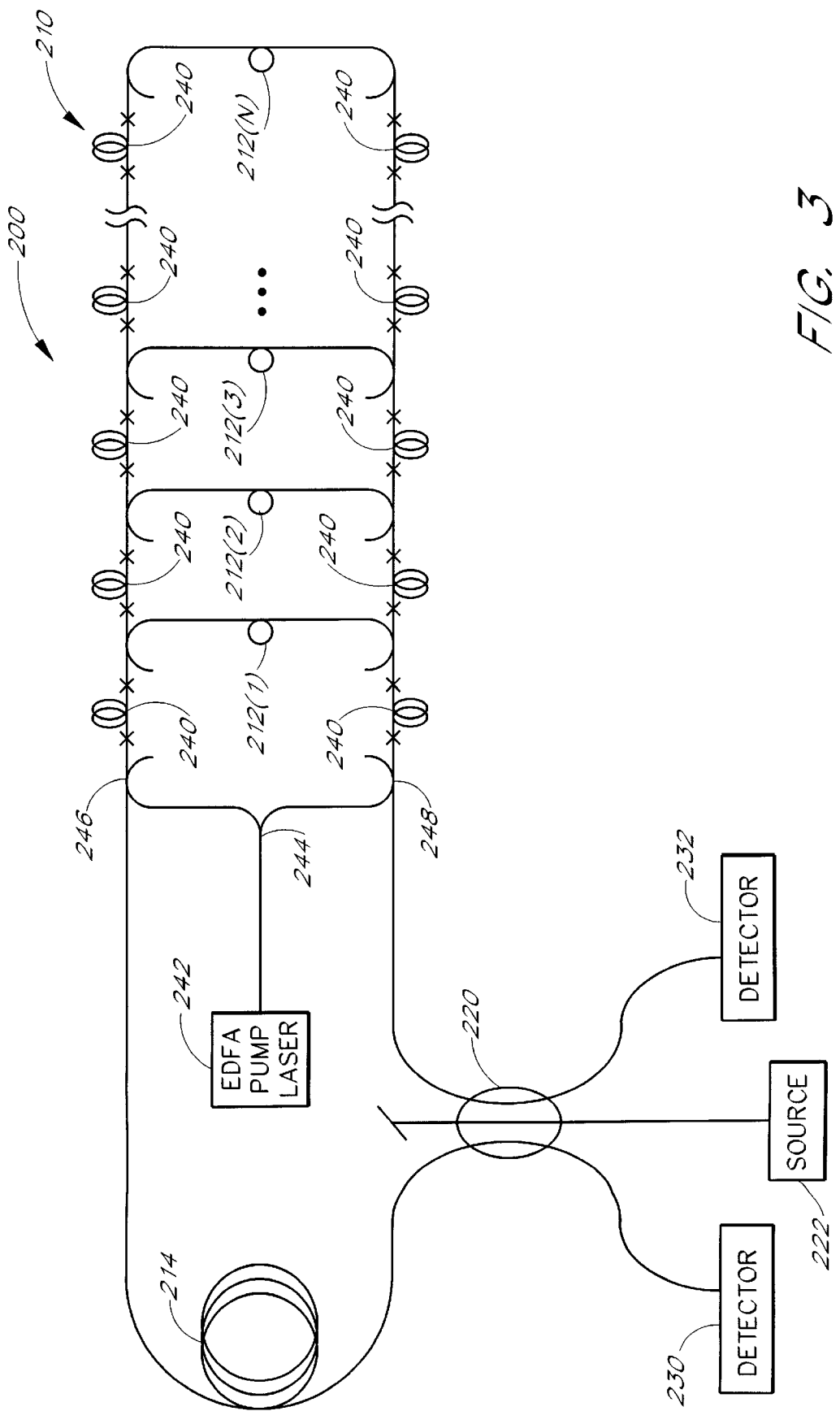
FIG. 3 illustrates a Sagnac sensor array which includes erbium-doped fiber amplifiers to regenerate signal power lost to coupling and dissipative losses.

As illustrated in FIG. 3, small-gain erbium doped fiber amplifiers (EDFAs) 240 are advantageously added to the array portion 210 just as EDFAs have been added to Mach-Zelinder interferometric sensor arrays. (See, for example, Craig W. Hodgson, et al., Optimization of Large-Scale Fiber Sensor Arrays Incorporating Multiple Optical Amplifiers-Part I: Signal-to-Noise Ratio, *JOURNAL OF LIGHTWAVE TECHNOLOGY*, Vol. 16, No. 2, February 1998, pp. 218–223; Craig W. Hodgson, et al., Optimization of Large-Scale Fiber Sensor Arrays Incorporating Multiple Optical Amplifiers-Part II. Pump Power, *JOURNAL OF LIGHTWAVE TECHNOLOGY*, Vol. 16, No. 2, February 1998, pp. 224–231; Jefferson L. Wagener; et al., Novel Fiber Sensor Arrays Using Erbium-Doped Fiber Amplifiers, *JOURNAL OF LIGHTWAVE TECHNOLOGY*, Vol. 15, No. 9, September 1997, pp. 1681–1688; and C. W. Hodgson, et al., Large-scale interferometric fiber sensor arrays with multiple optical amplifiers, *OPTICS LETTERS*, Vol. 22, No. 21, Nov. 21, 1997, pp. 1651–1653.) The EDFAs 240 increase the number of sensors which can be supported by a single array 210 by regenerating the signal power which is lost to coupling and dissipative losses. The EDFAs are advantageously pumped by one or more pump laser sources 242 via a splitting coupler 244 and via a first wavelength division multiplexing (WDM) coupler 246 and a second WDM coupler 248.

Because it uses the Sagnac architecture, the Sagnac sensor array 200 has all of the advantages of the single loop Sagnac based sensor 100 discussed above. The common-pate design eliminates the conversion of source phase noise into intensity noise at the interfering coupler 220. The source 222 can be a fiber ASE (amplified spontaneous emission) source (i.e., the SFS discussed above), which provides high powers inexpensively at 1.55 $\mu$m. Passive biasing near quadrature is achievable for all sensors by using the 3×3 coupler 220. Also, the 3×3 coupler 220 provides a convenient means to detect two interferometric outputs at the detectors 230, 232, and to use the outputs of the two detectors to subtract source excess noise. (See, for example, K. Krakenes, et. al., Sagnac interferometer for underwater sound detection: noise properties, *OPTICS LETTERS*, Vol. 14, 1989, pp. 1152–1154, which shows the use of two detectors in combination with a single Sagnac interferometer.)

The properties of this novel Sagnac sensor array 200 will be discussed more specifically below followed by a more detailed discussion of the frequency response and dynamic range which result from the use of a Sagnac interferometer. Thereafter, a calculation of the magnitude of the distributed pick-up from the non-hydrophone fiber loop segments will be described, along with a technique for reducing this pick-up magnitude. Polarization will also be addressed below. New sources of noise which are introduced by the Sagnac design are then discussed. Finally, multiplexing schemes other than TDM for the Sagnac sensor array are presented.

Although the present invention is described above with respect to a single sensor in each rung 216($i$) of the array 210, it should be understood that each rung 216($i$) may advantageously comprise a subarray having multiple sensors, such as are described, for example, in allowed U.S. patent application No. 08/814,548, filed on Mar. 11, 1997, U.S. Pat. No. 5,866,898, which issued on Feb. 2, 1999 which is incorporated by reference herein. (See, also, C. W. Hodgson, et al., Large-scale interferometric fiber sensor arrays with multiple optical amplifiers, *Optics Letters*, Vol. 22, 1997, pp. 1651–1653; J. L. Wagener, et al., Novel fiber sensor arrays using erbium-doped fiber amplifiers, *Journal of Lightwave Technology*, Vol. 15, 1997, pp. 1681–1688; C. W. Hodgson, et al., Optimization of large-scale fiber sensor arrays incorporating multiple optical amplifiers, Part I: signal-to-noise ratio, *Journal of Lightwave Technology*, Vol. 16, 1998, pp. 218–223; and C. W. Hodgson, et al., Optimization of large-scale fiber sensor arrays incorporating multiple optical amplifiers, Part II: pump power, *Journal of Lightwave Technology*, Vol. 16, 1998, pp. 224–231.)

Frequency Response

Figure 4:
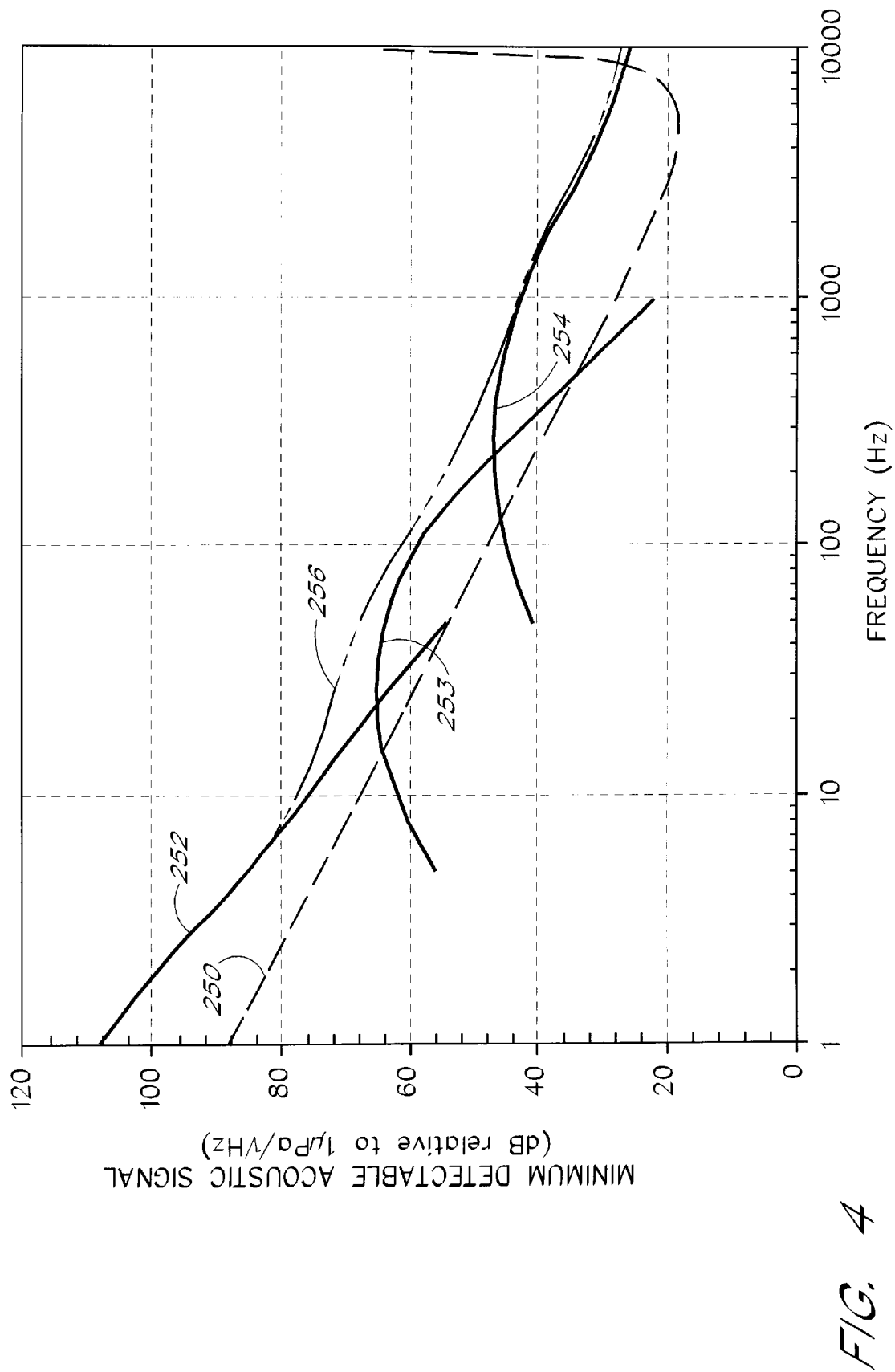
FIG. 4 illustrates a graph of the frequency response of a Sagnac interferometer in accordance with present invention compared with the three dominant ocean floor noises.

As set forth above, the Sagnac sensor has a frequency dependent response given by Equation 1. At frequencies well below the proper frequency of the loop, defined as $1/(2 \cdot T_{delay})$, the minimum detectable acoustic signal scales with the inverse of acoustic frequency. This decreased acoustic sensitivity at low frequencies has been a major concern for the Sagnac acoustic sensor. However, it has been pointed out that this decreased sensitivity at low frequencies is fortunately matched by an increasing ocean noise floor (See, for example, Sverre Knudsen, Ambient and Optical Noise in Fiber-Optic Interferometric Acoustic Sensors, *Fiber-Optic Sensors Based on the Michelson and Sagnac Interferometers: Responsivity and Noise Properties*, Thesis, Chapter 3, Norwegian University of Science and Technology, 1996, pp. 37–40.) Ideally, it would be desirable if the minimum detectable acoustic signal of an array at a given frequency were to be a constant amount below the ocean noise floor at that frequency. Thus, the minimum detectable acoustic signal would also increase at lower frequencies to match the increasing ocean noise floor. The frequency response of the Sagnac sensor array 200 of the present invention in fact does provide a good match between the ocean noise floor and acoustic sensitivity. This is illustrated in FIG. 4, where the minimum detectable acoustic signal for a Sagnac sensor array is plotted as a curve 250 assuming an optical noise floor of 10 $\mu$rad/$\sqrt{Hz}$, a hydrophone phase responsivity of $3.2 \times 10^{-7}$ rad/$\mu$Pa and a delay loop length of 20 km. (The vertical axis is in dB relative to a baseline of 1 $\mu$rad/$\sqrt{Hz}$.) Also plotted in FIG. 4 are the ocean noise floors for the three dominant ocean noise sources at these frequencies and a resulting sum of the noise from the three sources. A curve 252 represents the noise from ocean turbulence, earthquakes, volcanic eruptions, and the like. A curve 253 represents light shipping noise. A curve 254 represents DSSO (distant shipping and storms) noise. A curve 256 represents the sum of the noise floors from the three dominant sources (i.e., the sum of the curves 252, 253 and 254). (See, for example, Robert J. Urick, The noise background of the sea: ambient noise level, *Principles of Underwater Sound*, 3rd Ed., Chapter 7, McGraw-Hill, 1983, pp. 202–236.) The minimum detectable acoustic signal of the Sagnac sensor array 200 increases in such a way as to provide a nearly constant amount of detectable signal below the ocean noise floor at all frequencies below 10 kHz. Thus, the frequency-dependent response of the Sagnac sensor array 200 does not prohibit low-frequency acoustic detection. The Mach-Zehnder array shows the same trend as the Sagnac sensor array, namely a decreasing sensitivity towards lower frequencies, but in the Mach-Zehnder array, the decreasing sensitivity is smaller than in the Sagnac-based sensor.

Although both the Mach-Zehnder interferometer and Sagnac sensor array 200 have similar frequency-dependent responses, the source of their frequency responses is fundamentally different. The increasing minimum detectable signal in the Mach-Zehnder interferometer sensor array is due to an increasing optical noise floor. The cause of this increasing optical noise floor is the phase noise introduced by the path-imbalanced Mach-Zehnder interferometer. Thus, although the noise floor is 10 $\mu\text{rad}/\sqrt{\text{Hz}}$ at 10 kHz, it increases towards lower frequencies. In the Sagnac sensor array 200, the increasing minimum detectable acoustic signal is due to the sin ($\Omega T_{delay}/2$) term in Equation 1, and not to an increasing optical noise floor. The optical noise floor remains a constant 10 $\mu\text{rad}/\sqrt{\text{Hz}}$ over the entire frequency range.

Figure 5:
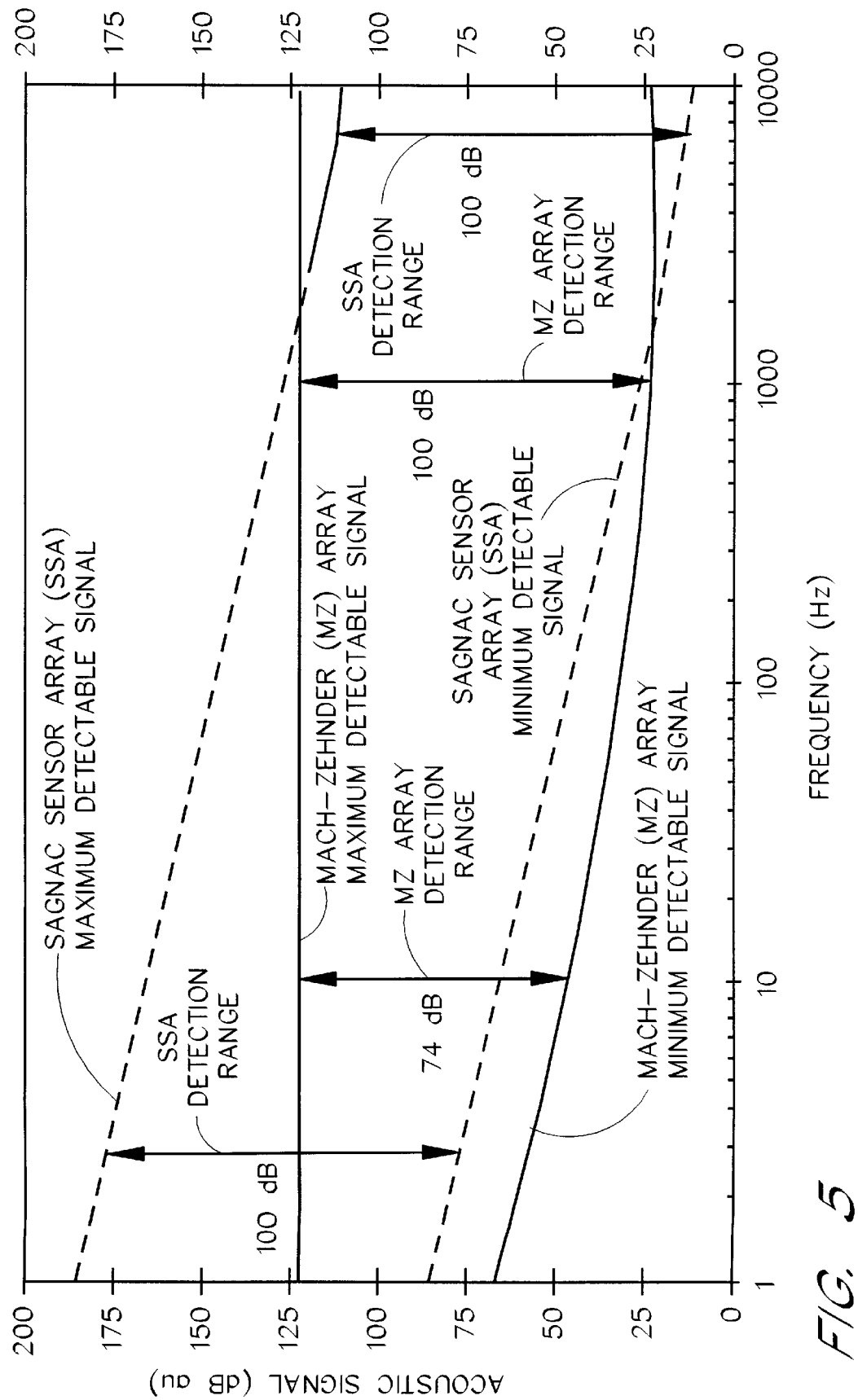
FIG. 5 illustrates graphs of the maximum and minimum acoustic signal detectable by a Mach-Zehnder interferometer and detectable by a Sagnac interferometer in accordance with the present invention, showing the relatively constant dynamic range of a Sagnac interferometer over a wide range of frequencies.

The significance of this difference can be seen by examining the dynamic range of the Mach-Zehnder interferometric sensor array and Sagnac sensor array 200, illustrated in FIG. 5. The dynamic range of a sensor is limited by the minimum and maximum detectable phase shifts. For interferometric sensors, the maximum detectable phase shift is limited by the nonlinear response of the interferometer and the minimum detectable phase shift by the optical noise floor. Both the Mach-Zehnder interferometric sensor array and the Sagnac sensor array have maximum detectable phase shifts which are constant cover the acoustic frequency range. However, the Sagnac sensor array 200 also has a flat minimum detectable phase shift because it has a flat optical noise floor, while the Mach-Zehnder interferometric sensor array suffers an increasing minimum detectable phase shift due to an increasing optical noise floor caused by the phase noise introduced by the path imbalanced interferometer. The Sagnac sensor array 200 thus has a constant dynamic range at all acoustic frequencies, while the Mach-Zehnder interferometric sensor array has a decreased dynamic range at low acoustic frequencies. This is illustrated in FIG. 5, wherein the minimum and maximum detectable acoustic signals (in dB arbitrary units) are plotted for the Sagnac sensor array 200 and a Mach-Zehnder interferometric sensor array. As shown in FIG. 5, both arrays have an approximately 100 dB dynamic range above 1 kHz, where phase noise does not limit the Mach-Zehnder interferometric sensor array. At 10 Hz, phase noise dominates the Mach-Zehnder interferometric sensor array, and its dynamic range is reduced to approximately 74 dB. Meanwhile, the dynamic range of the Sagnac sensor array 200 remains at approximately 100 dB.

Figure 6:
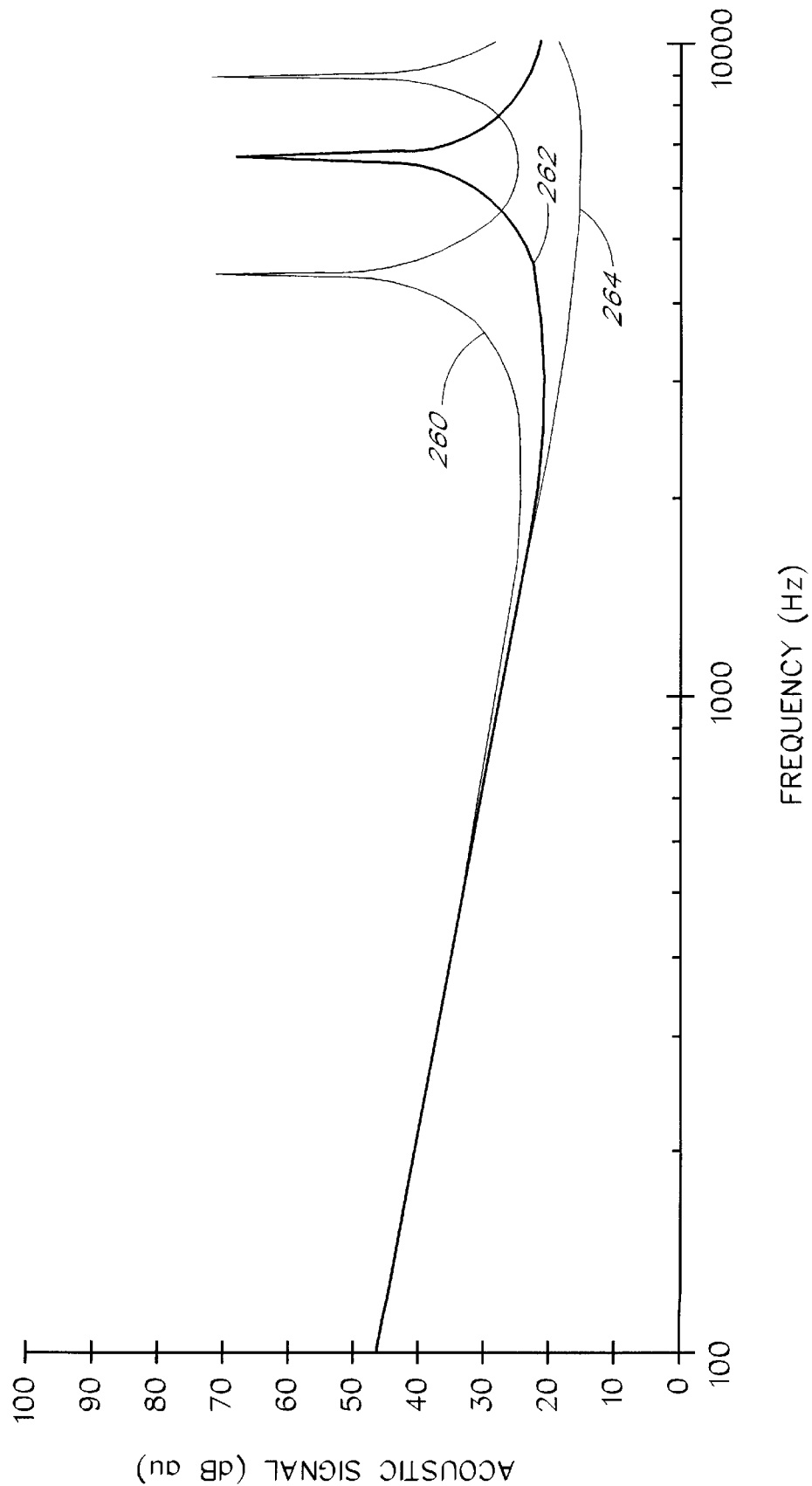
FIG. 6 illustrates graphs of the minimum detectable acoustic signal versus frequency for three Sagnac interferometer configurations having different lengths of fiber in the hydrophone and the delay loop.

It is interesting to examine the frequency response of the Sagnac sensor array 200 at frequencies well below the loop proper frequency as a function of the delay loop length and hydrophone responsivity. At these frequencies, the sin ($\Omega T_{delay}/2$) factor in Equation 1 can be approximated as $\Omega T_{delay}/2$, showing that the responsivity of the Sagnac sensor array 200 is proportional to the product of $\phi_h$ and $T_{delay}$. $\phi_h$ itself is proportional to the amount of fiber in each hydrophone 212($i$), and $T_{delay}$ is proportional to the amount of fiber in the delay loop 214. Thus, the responsivity at frequencies well below the loop proper frequency is proportional to the product of the hydrophone fiber length and delay fiber length. FIG. 6 plots the minimum detectable acoustic signal for several Sagnac sensor array configurations in which the product of the length of the fiber in each hydrophone 212($i$) and the length of the fiber in the delay loop 214 is constant, but the relative distribution of fiber between the delay loop 214 and each hydrophones 212($i$) changes. For example, a curve 260 represents the frequency response of a Sagnac sensor array 200 having 45 km of fiber in its delay loop 214 and 100 meters of fiber in each hydrophone 212($i$); a curve 262 represents the frequency response of a Sagnac sensor array 200 having 30 km of fiber in its delay loop 214 and 150 meters of fiber in each hydrophone 212($i$); and a curve 264 represents the frequency response of a Sagnac sensor array 200 having 15 km of fiber in its delay loop 214 and 300 meters of fiber in each hydrophone 212(i). As illustrated, each Sagnac sensor array 200 has the same sensitivity at low frequencies, but approaches a maximum sensitivity at different frequencies given by their respective loop proper frequencies. Thus, for a given minimum detectable acoustic signal at low frequencies, there is still some freedom in choosing the fiber lengths of the delay loop 214 and the hydrophones 212($i$). This freedom may be used to help the Sagnac sensor array 200 satisfy other criteria, such as minimizing the total amount of fiber required or minimizing the delay loop length.

Increasing the Dynamic Range of the Sagnac sensor array

As discussed above, the Sagnac sensor array 200 has a larger dynamic range at low acoustic frequencies than the Mach-Zehnder interferometric sensor array because it is immune to phase noise. Ideally, an array 200 provides enough dynamic range to detect the strongest and weakest acoustic signal which are likely to be encountered. This requirement often translates into a required dynamic range of approximately 150 dB. In order to achieve such a large dynamic range in a Mach-Zehnder interferometric sensor array, two separate sensors with different phase responsivities are required, with each detecting a fraction of the total 150 dB dynamic range. The obvious disadvantage to this scheme is that it requires two sensor arrays (i.e., twice as many hydrophones, rungs, sources and detectors). Effectively, an array which can support N hydrophones can detect the acoustic signal at only N/2 points.

Figure 7:
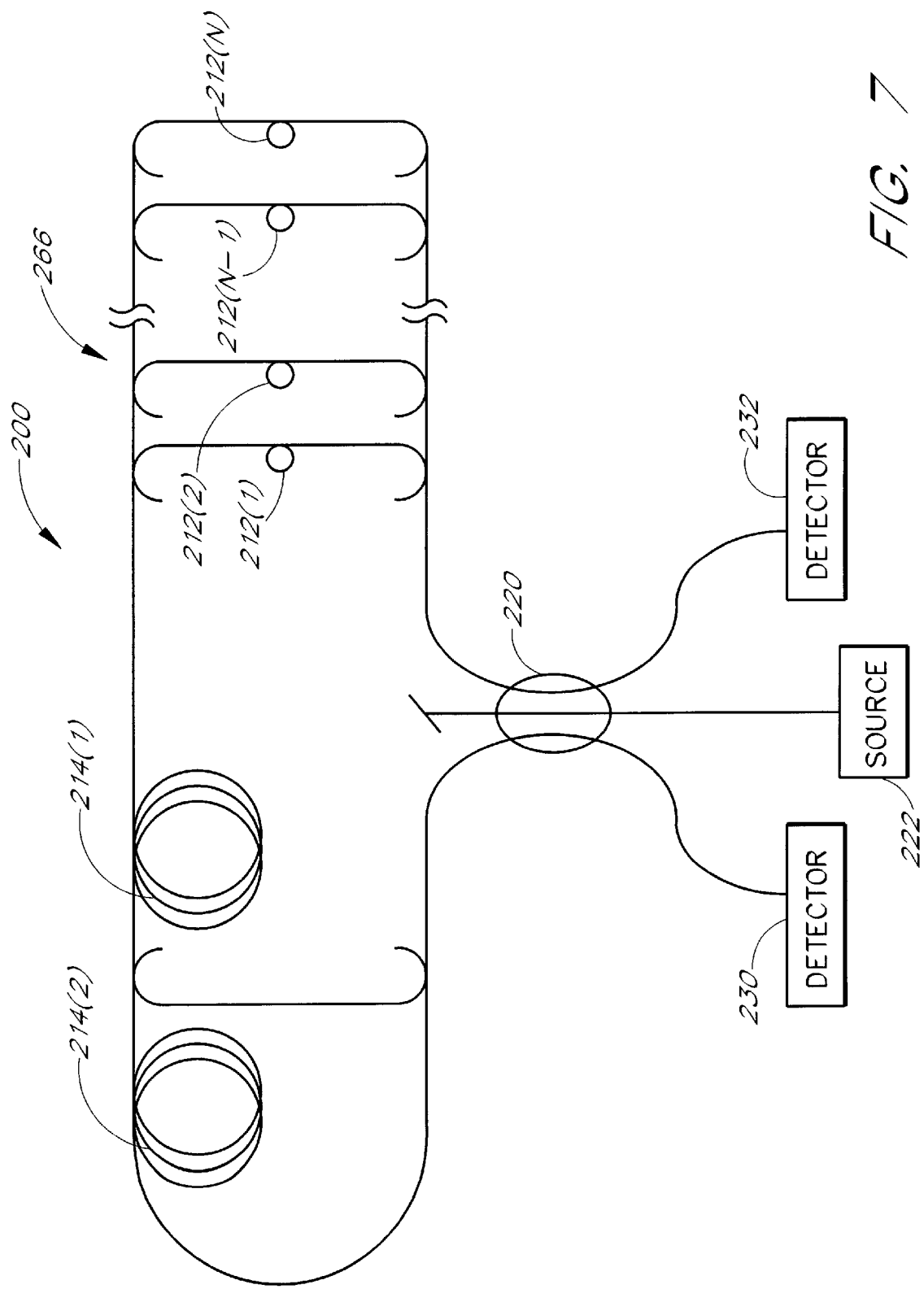
FIG. 7 illustrates a Sagnac interferometer in accordance with the present invention which includes an additional delay loop to increase the dynamic range of the interferometer.

In the Sagnac sensor array 200, it is possible to achieve a large dynamic range without using additional hydrophones 212. Because the phase responsivity in the Sagnac sensor array is a function of the hydrophone responsivity and delay loop length, as shown in Equation 1, the phase responsivity of the entire array of hydrophones can be changed by modifying the delay loop length. By simultaneously using two separate delay loops 214(1) and 214(2) of length $L_1$ and $L_2$, respectively, as shown in a modified sensor array 266 in FIG. 7, the detection range of the array 266 can be dramatically increased. The array 266 now has 2N separate Sagnac loops. Each hydrophone 212($i$) returns a separate signal for each of the two delay loop paths, and the length of each delay loop 214(1), 214(2) determines the acoustic detection range of that signal. The total acoustic detection range of each hydrophone 212(i) is the union of the detection ranges of each of the two Sagnac loop sensors which enclose the hydrophone 212(i). The lengths of $L_1$ and $L_2$ set the acoustic detection range. The length $L_1+L_2$ is chosen to allow the array 266 to detect the smallest acoustic signal of interest. The length $L_1$ of the delay loop 214(1) is then chosen to place the detection range of the signals which travel only this shorter delay loop on top of the detection range of the signals which travel both delay loops 214(1), 214(2). In a TDM system, as a result of the insertion of a second loop, the repetition frequency of the source pulses are halved in order to allow time for 2N pulses to return, and the lengths of the delay loops 214(1), 214(2) are chosen such that there is no pulse overlap. Because the repetition frequency is halved, the dynamic range of each individual signal decreases by 3 dB. This decrease is more than offset by the increase in the total dynamic range achieved by piggybacking the dynamic range of two separate signals. In FIG. 7, the second delay loop 214(2) is positioned such that all light passing through the second delay loop 214(2) passes through the first delay loop 212(1). It should be understood that, alternatively, the two delay loops 214(1), 214(2) can be optically in parallel such that the light which passes through the second delay loop 214(2) does not pass through the first delay loop 214(1). In such case, the fiber length of the second delay loop 214(2) would have to be the sum of the first length and the second length (i.e., $L_1+L_2$). But, since $L_1$ is considerably shorter than $L_2$, this adjustment is not essential. The embodiment of FIG. 7 reduces the total fiber requirements by adding the length of the first delay loop to the second delay loop.

Figure 8:
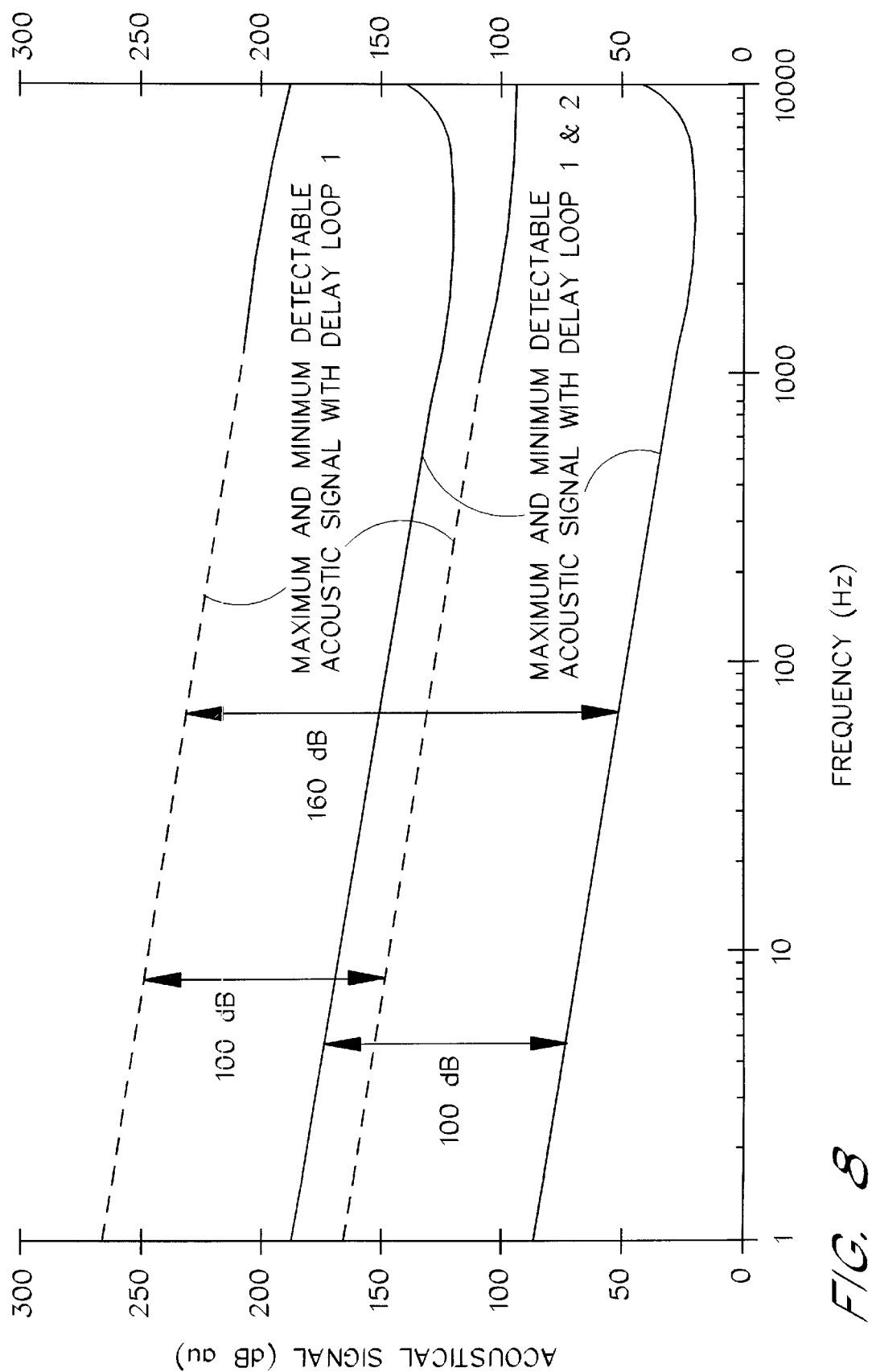
FIG. 8 illustrates a graph of the dynamic range provided by the interferometer of FIG. 7.

FIG. 8 illustrates the extended dynamic range made possible by using the two delay loops 214(1), 214(2) in the array 266 in which the dynamic range of each signal is 100 dB and the ratio L1/L2 was set to be 5000. As shown, the array 266 is now able to detect over the entire dynamic range of interest (approximately a 160-dB range) without increasing the hydrophone count.

Distributed Sensing

In the Sagnac sensor array 266, any phase modulation in the interferometer can be transferred into an intensity modulation at the interfering 3×3 coupler 220. This distributed sensing over the entire Sagnac loop is disadvantageous for an acoustic sensor array. In order to be practical, the acoustic sensor array should sample the acoustic signal at a member of discrete points in space (i.e., at the hydrophones) and return these signals independently. Mach-Zehnder interferometric sensor arrays achieve this because the interferometer is confined within a small space and thus only senses at that point. In order for the Sagnac sensor array 266 to be practical, the distributed sensing of the Sagnac loop must be decreased.

Figure 9:
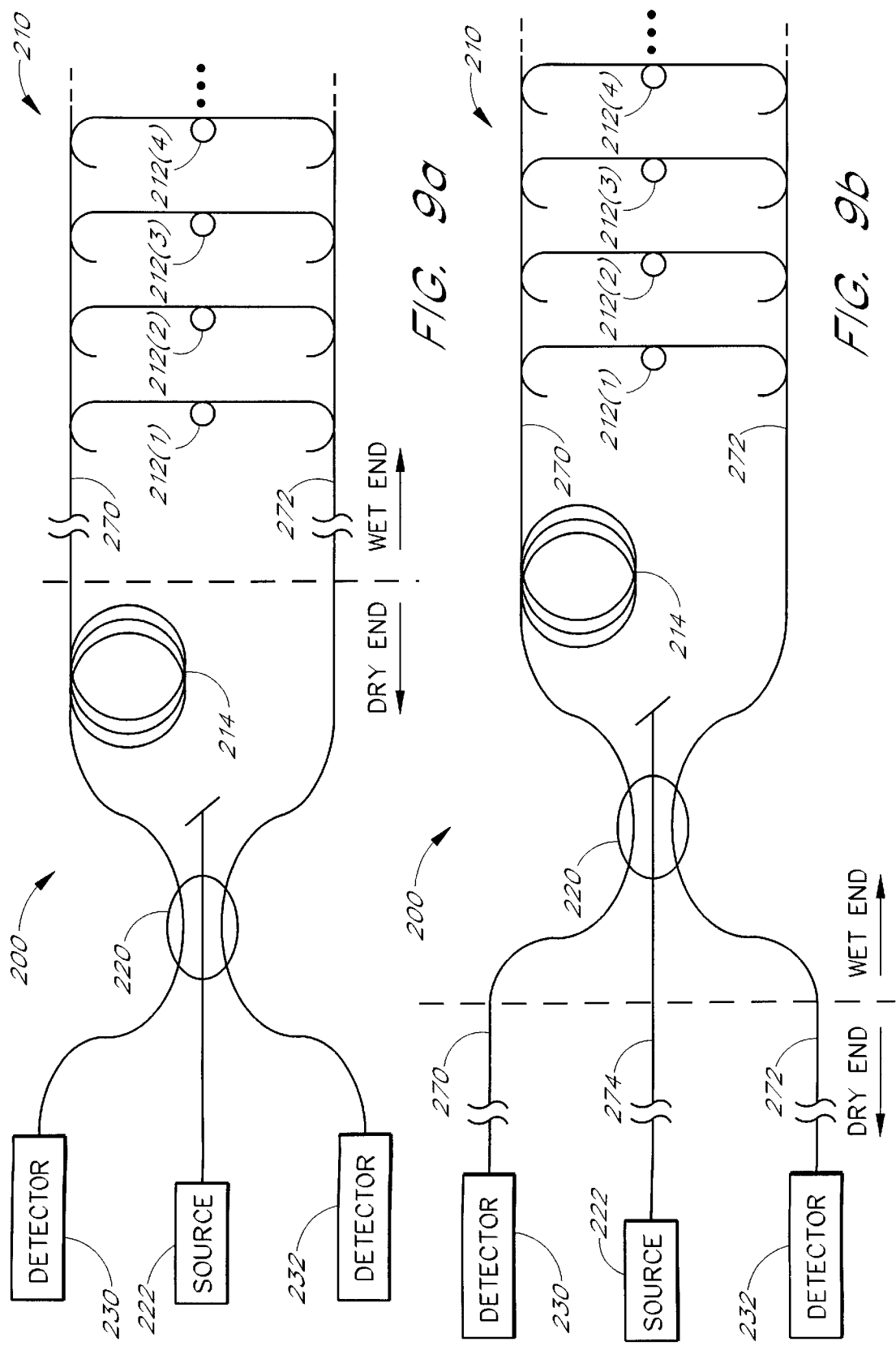
FIG. 9A illustrates the positioning of the delay loop of the interferometer in the dry end of a sensor array system.
FIG. 9B illustrates the positioning of the delay loop of the interferometer in the wet end of a sensor array system.

The bulk of the fiber in the interferometer constitutes the delay loop 214, which can be located in two positions. The first is with the source 222 and the detection electronics (i.e., the detector 230 and the detector 232) in the dry end (i.e., out of the water), as shown in FIG. 9A. Here the delay loop 214 can be environmentally shielded to minimize any external modulation. However, downlead fibers 270, 272 which connect the wet end to the array portion 210 are part of the interferometer. The second possibility is to locate the delay loop 214 in the wet end (i.e., in the water) with the array 210, as shown in FIG. 9B. As such, the delay loop 214 cannot be isolated to the same extent as it could if it were located in the dry end, but the downlead fibers 270, 272, 274 are outside of the interferometer and thus are non-sensing. The relative magnitude of the downlead and delay loop distributed pick-up dictates which configuration is best suited for a particular application. It should be noted that if the delay loop 214 is located in the dry end (FIG. 9A), the downlead fibers 270, 272 must remain stationary to prevent physical movements, such as bending and vibrations, of these fibers, which can induce extremely large phase modulations. These are fiber motion induced phase modulations as opposed to acoustically-induced phase modulations. (Such physical movements are problems in towed arrays, but may not be significant problems in stationary arrays.) Thus, if the delay loop 214 is located in the dry end (FIG. 9A), the entire wet end of the Sagnac sensor array 210 must be stationary. However, with the delay loop 214 located in the wet end (FIG. 9B), only the portion to the right of the 3×3 coupler 220 in FIG. 9B must remain stationary since the downlead fibers 270, 272, 274 are not then part of the interferometer. When the delay loop 214 is located in the wet end (FIG. 9B), the delay loop fiber must be desensitized. The delay loop 214 can be made stationary by wrapping the delay loop fibers around a desensitized cylinder (not shown), thereby eliminating fiber motion and making acoustic pick-up the dominant source of distributed pick-up signal. Because it is easier to desensitize fiber to acoustically-induced phase modulation than it is to desensitize fiber to movement-induced phase modulation, the configuration which locates the delay loop 214 in the wet end (FIG. 9B) is preferable for towed array applications and will be described in more detail below.

Calculation of the Acoustic Pick-up Noise Induced in the Delay Loon

Figure 10:
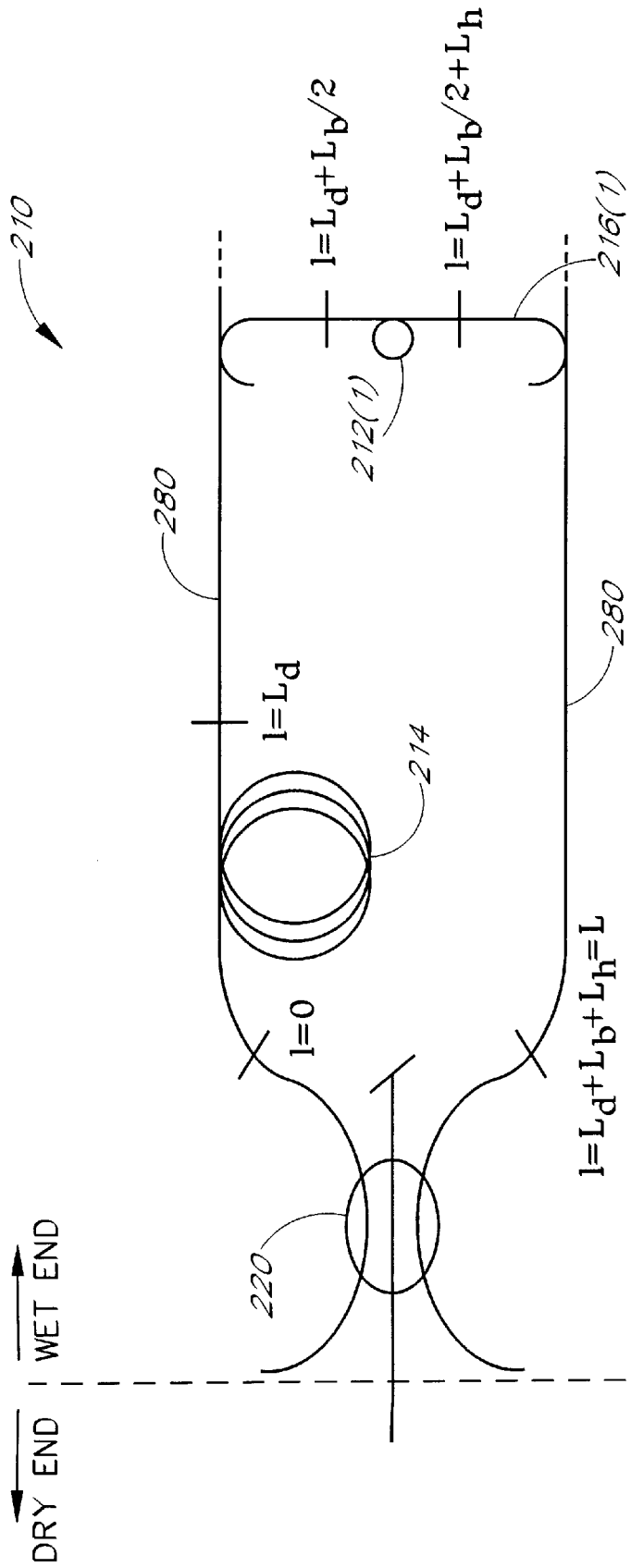
FIG. 10 illustrates the Sagnac interferometer of FIG. 9B with annotations showing the lengths used in calculations of the effects of phase modulation.

In this section, estimates are derived for the magnitude of the acoustically induced distributed pick-up noise as compared to the acoustically induced hydrophone phase modulation in the Sagnac sensor array 210 of FIG. 9(b). The intensity modulation due to the distributed phase modulations resulting from the pick-up of acoustic signals in the delay loop and bus fiber (the fiber connecting each hydrophone to the delay loop and the 3×3 coupler) can be considered a source of noise. For the following discussion, consider one loop of the Sagnac sensor array as comprising only delay fiber of length $L_d$, a bus fiber of length $L_b$, a hydrophone fiber of length $L_h$, and a total length L, as shown in FIG. 10. Also assume that $L_d$ is much larger than $L_b$ and $L_h$. The phase responsivity of fiber to acoustic signals results from a pressure dependent propagation constant, β. In general, the pressure dependent component of the propagation constant at a position l and time t can be written as:

$$\beta(l,t)=\beta_o R(l)P(l,t) \quad (2)$$

where $\beta_o$ is the zero-pressure propagation constant, R(l) is the normalized phase responsivity of the fiber, and P(l,t) is the pressure as a function of space and time. If a sinusoidal acoustic signal of frequency Ω is assumed, Equation 2 can be rewritten as:

$$\beta(l,t)=\beta_o R(l)[P_0+P_m \sin(\Omega t+\theta(l))] \quad (3)$$

where $P_0$ is the steady-state pressure, $P_m$ is the amplitude of the pressure modulation (assumed to be independent of l), and θ(l) contains the spatial phase variation of the acoustic wave. In general, the induced phase difference between interfering beams in a Sagnac loop due to acoustically induced phase modulation from $l=l_1$ to $l=l_2$ is given by the integral:

$$\phi_{int}(t) = \int_{l_1}^{l_2}\left[\beta\left(l, t + \frac{(l-L)}{v}\right) - \beta\left(l, t - \frac{l}{v}\right)\right]dl \quad (4)$$

where v is the speed of light in the fiber, and L is the loop length. Substituting Equation 3 into Equation 4 yields:

$$\phi_{int}(t) = \beta_0 P_m \int_{l_1}^{l_2} R(l)\left[\sin\left(\Omega\left(t + \frac{l-L}{v}\right) + \theta(l)\right) - \sin\left(\Omega\left(t - \frac{l}{v}\right) + \theta(l)\right)\right]dl \quad (5)$$

Equation 5 can be used to determine the phase difference between interfering beams due to acoustic modulation of the hydrophone, bus, and delay fibers.

For the hydrophone fiber, Equation 5 is integrated from $l_1 = l_d + l_b/2$ to $l_2 = l_d + l_b/2 + l_h$. It is assumed that $\theta(l)$ is constant over this range (i.e., that the acoustic wavelength is much larger than the dimension of the hydrophone). It is also assumed that the normalized phase responsivity of the fiber, R(l), is constant and is equal to $R_h$ in this range. Equation 5 then gives a phase difference amplitude between interfering beams due to hydrophone fiber modulation:

$$\phi_{int}^h = 2\beta_0 R_h P_m L_h \sin\left(\frac{\Omega \cdot T_{delay}}{2}\right), \quad (6)$$

where it is assumed that $\Omega L_h/2v \ll 1$. Note that Equation 2 agrees with the expression given in Equation 1.

For the bus fiber, Equation 5 is integrated first from $l_1 = l_d$ to $l_2 = l_d + l_b/2$, and then from $l_1 = L - l_b/2$ to $l_2 = L$ to include both the upper and lower bus lines. Again, it is assumed that R(l) is constant and equal to $R_b$ for all bus fiber, such that $\theta(l)$ is constant in the integral of Equation 5. The phase difference amplitude between interfering beams due to fiber modulation becomes:

$$\phi_{int}^b = 2\beta_0 R_b P_m L_b \sin\left(\frac{\Omega \cdot T_{delay}}{2}\right), \quad (7)$$

where it is assumed that $\Omega L_h/2v \ll 1$. It should be emphasized that the assumptions on the constancy of $\theta(l)$ and the amplitude of $\Omega L_h/2v$ act to increase $\phi_{int}^b$, thus giving a worst case scenario for the bus fiber.

For the delay fiber, Equation 5 is integrated from $l_1 = 0$ to $l_2 = l_d$, and, as before, it is assumed that $\theta(l)$ is constant over this range (i.e., the delay loop coil is much smaller than the acoustic wavelength), and that R(l) is constant and equal to $R_d$ over the integral. Equation 5 then yields a phase difference amplitude between interfering beams due to delay fiber modulation given by:

$$\phi_{int}^d = 2\beta_0 R_d P_m (L - L_d)\sin\left(\frac{\Omega T_{delay}}{2}\right) \quad (8)$$
$$= 2\beta_0 R_d (L_b + L_h)\sin\left(\frac{\Omega T_{delay}}{2}\right),$$

where it is assumed that $\Omega(L_b + L_h)2v \ll 1$.

With Equations 6–8, the relative magnitude of these phase modulations amplitudes can be computed. First, it is noted that a standard plastic coated fiber has a normalized phase responsivity, R, of −328 dB re 1/μPa, as described, for example, in J. A. Bucaro, et al., Optical fibre sensor coatings, *Optical Fiber Sensors, Proceedings of the NATO Advanced Study Institute,* 1986, pp. 321–338. On the other hand, as described, for example, in C. C. Wang, et al., Very high responsivity fiber optic hydrophones for commercial applications, *Proceedings of the SPIE-The International Society for Optical Engineering,* Vol. 2360, 1994, pp. 360–363, a fiber wrapped around current hydrophones made from air-backed mandrels has a normalized phase sensitivity of −298 dB re 1/μPa, an increase of 30 dB over standard fiber. If we assume that the delay loop and the bus fiber have the normalized phase responsivity of standard plastic coated fiber, and that the hydrophone fiber is wrapped around an air-backed mandrel, then the ratio of $R_h$ to $R_b$ or $R_d$ is approximately 30 dB. Therefore, under the simplifying assumption made to reach Equations 6–8, it can be found that:

$$\frac{\phi_{int}^h}{\phi_{int}^d} \approx \left(\frac{31}{1 + (L_b/L_h)}\right) \quad (9)$$

and $$\frac{\phi_{int}^h}{\phi_{int}^b} \approx \left(\frac{31}{L_b/L_h}\right). \quad (10)$$

The ratio $L_b/L_h$ is a function of the hydrophone position. For the first hydrophone, $L_b/L_h = 0$ making $\phi_{int}^h/\phi_{int}^d = 31$ and $\phi_{int}^h/\phi_{int}^b$ extremely large. For the last hydrophone, typical values of 100 meters and 1 km for $L_h$ and $L_b$, respectively, are used to arrive at $\phi_{int}^h/\phi_{int}^d \approx \phi_{int}^h/\phi_{int}^b \approx 3$. Thus, despite the fact that the hydrophone fiber constitutes a relatively small amount of the overall Sagnac loop, the magnitude of the acoustically induced phase modulations in the hydrophone fiber are greater than the acoustically induced phase modulations in the delay loop fiber and in the bus fiber for even the furthest hydrophone. The following section describes a means for dealing with this level of distributed pick-up noise using empty rungs.

Figure 11:
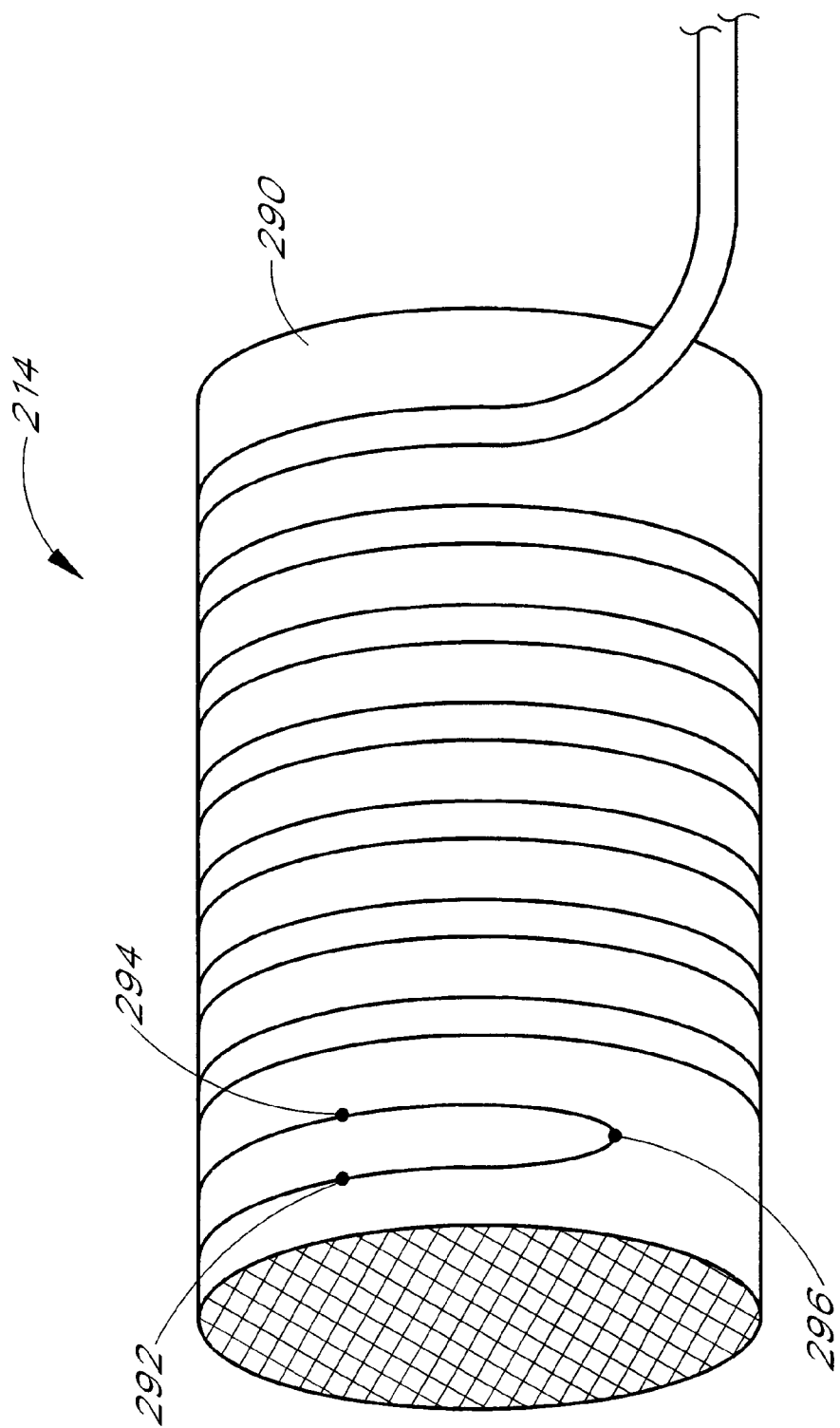
FIG. 11 illustrates a technique for winding the delay loop so as to reduce the effects of the acoustic wave upon the delay loop.

In order to evaluate the integral in Equation 5 for the delay loop fiber, it is assumed that $R(l) = R_d$ for all l less than $L_d$. It was this constancy of R(l) which eliminated any contribution to the integral of Equation 5 from $l = (L - L_d)$ to $L_d$ (because the integrand became an odd function about L/2). However, coiling a long length of fiber will result in some dependence in R(l) on l (possibly because the inner layer of fiber has a different R than the outer layer). These variations in R(l) increase the delay loop pick-up from $l = L - L_d$ to $L_d$. In order to reduce this pick-up, it is first noted that R(l) need only be an even function around L/2 to make the integrand of Equation 5 an odd function about L/2. R(l) can be forced to be more symmetric about L/2 by wrapping the delay loop in such a way as to position symmetric points of the fiber loop next to each other as shown in FIG. 11. Such a wrapping ensures that symmetric points of the delay loop are positioned in proximity to each other so that any variations in R(l) due to the position of the fiber on the coil are as symmetric about L/2 as possible, thereby making the delay loop pick-up as close to the expression of Equation 8 as possible. Note that, because each Sagnac loop in the Sagnac sensor array has a different L/2 point, only one loop can be wrapped exactly as shown in FIG. 11, thereby introducing a small degree of oddness in R(l) to all but one of the Sagnac loops.

It should also be mentioned that in addition to enhancing the acoustic sensitivity of fiber with a hydrophone, it is possible to desensitize fibers by applying a metallic coating of a particular diameter. (See, for example, J. A. Bucaro, Optical fibre sensor coatings, cited above.) Measured normalized phase responsivities as low as −366 dB re 1/μPa have been reported. If such fibers are used in the delay or bus lines, the ratio of $R_h$ to $R_b$ or the ratio of $R_h$ to $R_d$ approaches 68 dB (instead of 30 dB with plastic coated delay and bus fibers), increasing the hydrophone induced signal over the delay and bus induced signal by 38 dB.

Reducing the Distributed Pick-up Noise by Using Empty Rungs

Figure 12:
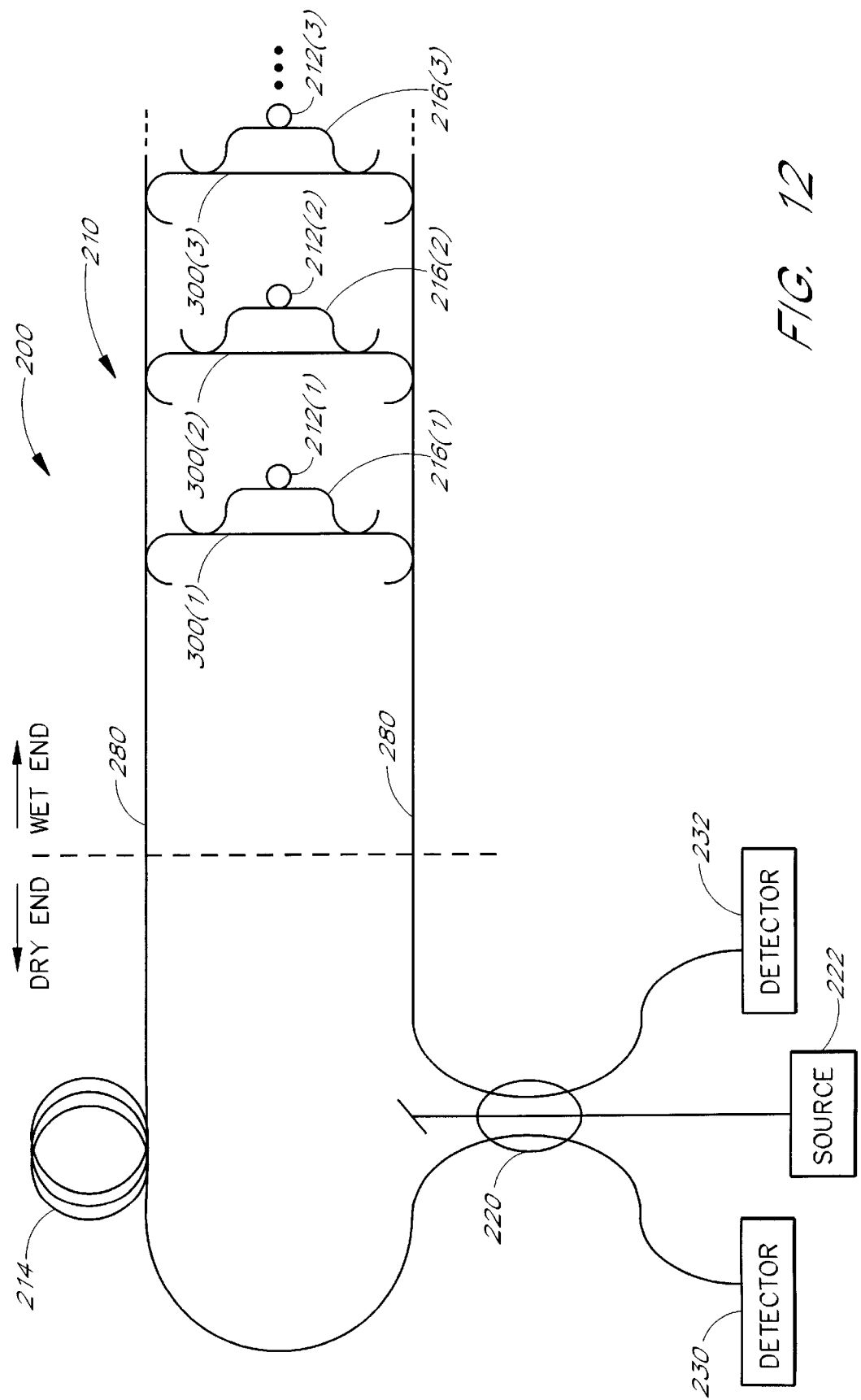
FIG. 12 illustrates a Sagnac interferometer in accordance with the present invention which includes empty rungs which detect distributed pick-up noise which can be subtracted from thy signals generated by the sensors.

In order to further eliminate distributed pick-up signal, the hydrophone-induced acoustic modulation can be isolated from the distributed pick-up modulation by placing empty rungs 300 that do not contain a hydrophone in the array 210, as shown in FIG. 12. Each rung 216(i) which contains a hydrophone 212(i), called a sensing rung, is proceeded by one of the empty rungs 300(i). The fact that the non-sensing fiber of each loop which encloses an empty rung 300(i) is nearly identical to the non-sensing fiber of the loop which encloses the corresponding sensing rung 212(i) means the empty rung 300(i) and the corresponding sensing rung 212(i) will have nearly the same distributed pick-up signal. By treating this empty rung 300(i) as another sensor in the array 210 and properly timing the pulses (in the TDM scheme) from the empty rungs 300(i) and the sensing rungs 212(i) so that they do not overlap, the distributed pick-up signal present on each sensing rung 212(i) can be measured. After detection, this signal can be subtracted from the sensing rung signal, leaving only intensity variations produced by phase modulations in the hydrophone fiber. Implementing such a scheme requires 2N rungs for an N sensor array 210, thereby reducing the duty cycle of individual signals by one half.

If desensitizing the bus portion of the array 210 is not required, a single empty rung 300 can be placed in the array 210 to measure the distributed pick-up signal associated with the delay loop 214, thereby requiring only N+1 rungs (N sensing rungs 212(i) and cone empty rung 300) for N sensors. If one empty rung 300 does not adequately measure the distributed pick-up signal for each sensing rung 212(i), more empty rungs 300 can be added at periodic intervals along the array, until the distributed pick-up signal present on each sensing rung 212(i) can be adequately measured by the nearest of these empty rungs 300. Using fewer empty rungs results in a higher duty cycle for individual signals. FIG. 12 depicts the extreme in which an empty rung was added for every sensing rung.

Polarization

Figure 13:
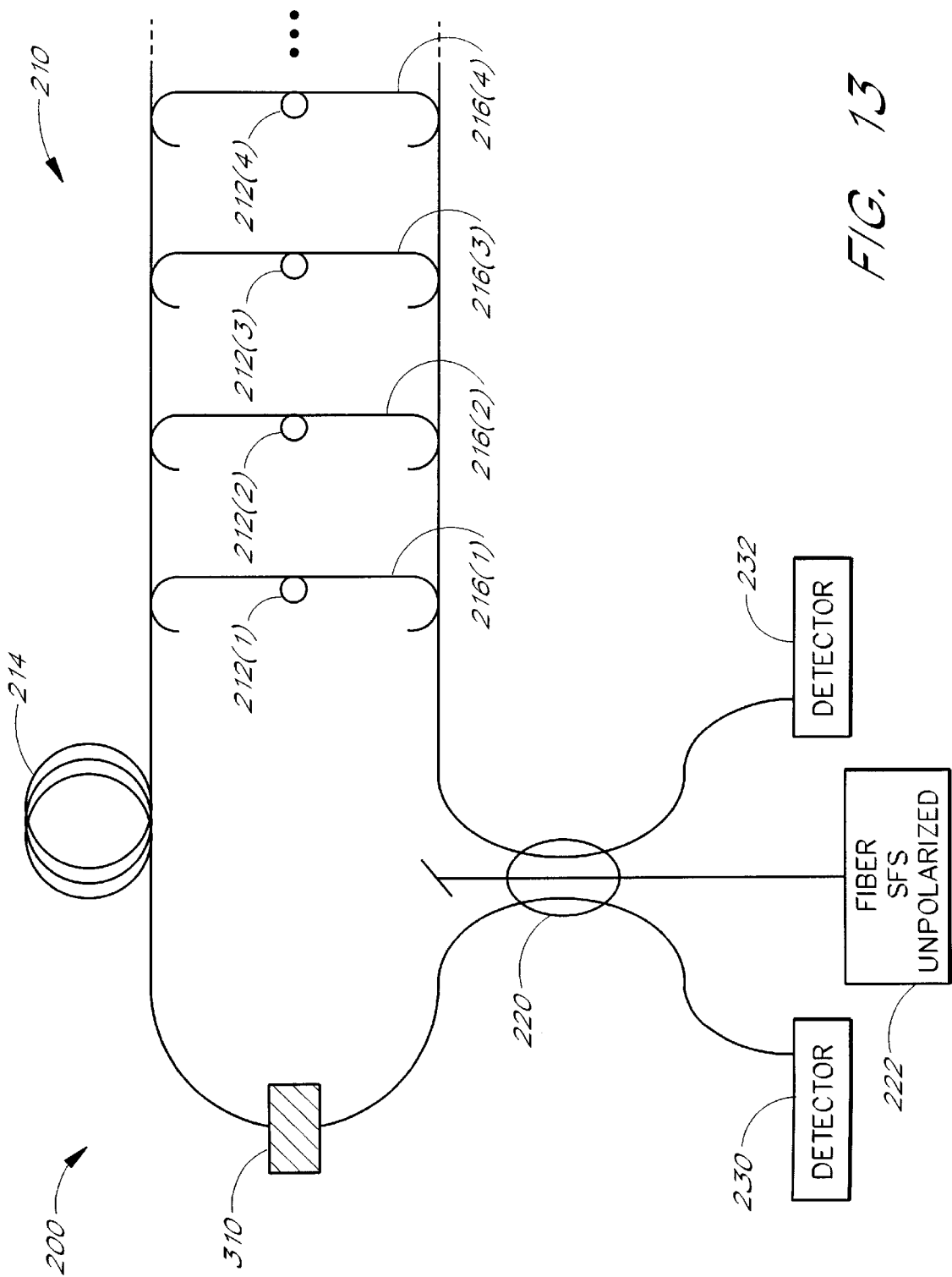
FIG. 13 illustrates a Sagnac interferometer in accordance with the present invention which includes a depolarizer to reduce the effects of polarization induced fading.

For maximum contrast in any interferometric sensor, the state of polarization (SOP) of these interfering beams must be identical when they recombine. If they are orthogonal, there is no interference and thus no amplitude-modulated signal. This is referred to as polarization-induced signal fading. Because each sensor in the Sagnac sensor array is a Sagnac loop, the research carried out so far on polarization-induced signal fading in the Sagnac fiber gyroscope applies to the Sagnac sensor array as well. One promising solution is to place a depolarizer within the Sagnac loop. (See, for example, K. Böhm, et al., LOW-DRIFT FIBRE GYRO USING A SUPERLUMINESCENT DIODE, *ELECTRONICS LETTERS*, Vol. 17, No. 10, May 14, 1981, pp. 352–353.) The depolarizer ensures that at least half of the optical power is returning to the 3×3 coupler in the correct SOP at all times. This general approach produces a constant visibility regardless of the loop birefringence. (See, for example, William K. Burns, et al., Fiber-Optic Gyroscopes with Depolarized Light, *JOURNAL OF LIGHTWAVE TECHNOLOGY*, Vol.10, No. 7, July 1992, pp. 992–999). The simplest configuration uses an unpolarized source such as a fiber superfluorescence source and a depolarizer in the loop. As illustrated in FIG. 13, in the Sagnac sensor array 200, one depolarizer 310 is placed at a point which is common to all the Sagnac loops. The depolarizer 310 ensures that each sensor 212(i) has this constant visibility independent of birefringence as long as the loop birefringence remains constant. This represents a great simplification in the handling of polarization-induced signal fading over those methods used in Mach-Zehnder interferometric sensor arrays.

Although slow changes in the birefringence will be sufficiently canceled by the reciprocal nature of the Sagnac interferometer, birefringence modulations at frequencies in the acoustic range of interest will produce polarization noise. Most birefringence modulation at these frequencies occurs as a result of physical fiber movement. Thus, the Sagnac loop should remain stationary in order to reduce the polarization noise (as well as the distributed pick-up signal).

Noise Sources Introduced by the use of the Sagnac Interferometer

Thermal Phase Noise

Because the index of refraction of the fiber changes with temperature, thermal fluctuations in a fiber will produce phase fluctuations in the light traveling through it. These index variations are uncorrelated over the length of fiber, and thus the resulting phase fluctuations scale as the square root of length. Because Mach-Zehnder interferometers typically use less than 100 meters of fiber in each arm, the magnitude of this thermal phase noise is negligible. The Sagnac interferometer has a great deal more fiber in the interferometer and as a result, thermal phase noise can become a limiting noise source. The magnitude of this thermal phase noise in a Sagnac interferometer has been described theoretically and confirmed by experiment. (See, for example, Sverre Knudsen, et al., Measurements of Fundamental Thermal Induced Phase Fluctuations in the Fiber of a Sagnac Interferometer, *IEEE Photonics Technology Letters*, Vol. 7, No. 1, 1995, pp. 90–93; and Kjell Krakenes, et al., Comparison of Fiber-Optic Sagnac and Mach-Zehnder Interferometers with Respect to Thermal Processes in Fiber, *JOURNAL OF LIGHTWAVE TECHNOLOGY*, Vol. 13, No. 4, April 1995, pp. 682–686.). For loops greater than 2 km, the thermal phase noise can exceed 1 $\mu\text{rad}/\sqrt{\text{Hz}}$ in the frequency range of interest, which is on the order of the required array sensitivity.

The thermal phase noise can be considered as a source of distributed pick-up noise, akin to an external modulation to the delay loop, and as such can be reduced by using empty rungs, as described above. Thermal phase noise can also be reduced by shortening the loop length. As discussed above, the loop length can be shortened without changing the low frequency sensitivity by increasing the hydrophone fiber length by the same factor as that by which the delay loop was decreased. For example a 40-km delay loop with 50 meters of hydrophone fiber has the same low-frequency response as a 20-km delay loop with 100 meters of fiber. The latter combination however will suffer less thermal phase noise because the total delay loop length is shorter by almost a factor of two.

Kerr Effect Induced Phase Noise

Kerr-induced phase shifts which can be generated in a Sagnac interferometer have received a great deal of attention for the fiber optic gyroscope. (See, for example, R. A. Bergh, et al., Source statistics and the Kerr effect in fiber-optic gyroscopes, OPTICS LETTERS, Vol. 7, No. 11, November 1982, pp. 563–565; R. A. Bergh, et al., Compensation of the optical Kerr effect in fiber-optic gyroscopes, OPTICS LETTERS, Vol. 7, No. 6, June 1982, pp. 282–284; and N. J. Frigo, et al., Optical Kerr effect in fiber gyroscopes: effects of nonmonochromatic sources, OPTICS LETTERS, Vol. 8, No. 2, February 1983, pp. 119–121.) The demands of the gyroscope and the acoustic sensor, however, are different because the gyroscope measures DC levels. Small DC offsets created by Kerr-induced phase shifts which would limit a fiber gyroscope are non-issues with an acoustic sensor. The Kerr-induced DC phase shift is not a problem as long as it does not move the bias point too far away from quadrature. The intensity noise on the light source can produce a Kerr induced phase noise on the output. However, the magnitude of this Kerr-induced AC phase noise is small as long as the Kerr-induced DC phase shift remains small. The origin of Kerr-induced phase shifts in the Sagnac sensor array is different than in the fiber gyroscope. The asymmetry of the Sagnac sensor array invites such a Kerr phase shift much more readily than the nominally symmetric gyroscope does. That asymmetry results from the array portion as well as any placement of EDFAs which are asymmetric, in that one beam sees gain before propagating through the delay loop, then sees loss, while the counter-propagating beam sees loss, then sees gain. It is possible to balance these asymmetries and null the Kerr-induced phase shift by choosing the proper location for EDFAs in the delay loop. The specifics depend on the exact array configuration and which multiplexing scheme is used.

Non-linear phase modulation resulting from the EDFAs

The population inversions created in the EDFAs induce a phase shift on the signal light that passes through it. (See, for example, M. J. F. Digonnet, et al., Resonantly Enhanced Nonlinearity in Doped Fibers for Low-Power All-Optical Switching: A Review, OPTICAL FIBER TECHNOLOGY, Vol. 3, No. 1, January 1997, pp. 44–64.) This phenomenon has been used to produce all-optical interferometric switches. In a Sagnac sensor array, the EDFAs within the interferometer create a nonlinear phase shift via the same mechanism. Variations in the population inversion due to pump or signal power fluctuations will produce phase modulations which will be converted to an intensity noise.

In order to estimate the magnitude of this noise source, a determination must be first made is to how the inverted population responds to pump and signal power fluctuations. This is relatively straightforward to do by invoking the rate equations for an erbium system:

$$N_1 + N_2 = N_0, \tag{11}$$

$$\frac{d}{dt}N_2 = \frac{I_p \sigma_p^a}{h\nu_p A_{\it eff}}N_1 + \frac{I_s \sigma_s^a}{h\nu_s A_{\it eff}}N_1 - \frac{I_p \sigma_p^e}{h\nu_p A_{\it eff}}N_2 - \frac{I_s \sigma_s^e}{h\nu_s A_{\it eff}}N_2 - \frac{N_2}{\tau_2}, \tag{12}$$

where $N_1$ and $N_2$ are the population densities of the lower and excited states respectively, $N_0$ is the total population density, I is the intensity, $\sigma$ is the cross section, $A_{\it eff}$ is the effective mode area in the fiber, and $\tau_2$ is the lifetime of level two. The subscripts p and s denote pump and signal, respectively, and the superscripts a and e denote absorption and emission, respectively.

By splitting $N_1$, $N_2$, $I_p$, and $I_s$ into their steady-state and time-varying components, then substituting this into Equation 12 and combining Equation 12 with Equation 11, the result is:

$$\frac{d}{dt}N_2(t) = \left[\frac{N_o \sigma_p^a + N_2^{ss}(\sigma_p^e + \sigma_p^a)}{h\nu_p}\right]I_p(t) + \tag{13}$$

$$\left[\frac{N_o \sigma_s^a + N_2^{ss}(\sigma_s^e + \sigma_s^a)}{h\nu_s}\right]I_s(t) +$$

$$\left[\frac{I_p^{ss}(\sigma_p^e + \sigma_p^a)}{h\nu_p} + \frac{I_s^{ss}(\sigma_s^e + \sigma_s^a)}{h\nu_s} + \frac{1}{\tau_2}\right]N_2(t) -$$

$$\left[\frac{(\sigma_p^e + \sigma_p^a)}{h\nu_p}\right]I_p(t)N_2(t) -$$

$$\left[\frac{(\sigma_s^e + \sigma_s^a)}{h\nu_s}\right]I_s(t)N_2(t),$$

where the superscript ss denotes steady-state values, and the time-varying components are now written as explicit functions of time ($N_2 = N_2^{ss} + N_2(t)$). If it is assumed that $N_2(t)$ is much smaller than $N_2^{ss}$, then the last two terms in Equation 13 can be neglected. By writing $I_p(t) = I_p^m \sin(f_p t)$ and $I_s(t) = I_s^m \sin(f_s t)$ (where $I_p^m$ and $I_s^m$ denote the modulation amplitudes of $I_p(t)$ and $I_s(t)$, respectively, and $f_p$ and $f_s$ respectively denote the pump and signal modulation frequencies) and solving the resulting differential equations, it can be found that:

$$\frac{|N_2(f_p)|}{N_2^{ss}} \approx \tag{14}$$

$$\left(\frac{\sigma_s^a(\sigma_p^e + \sigma_p^a) - \sigma_p^a(\sigma_s^e + \sigma_s^a)}{(\sigma_p^e + \sigma_p^a)^2} \cdot \frac{\nu_p}{\nu_s}\right)\left(\frac{1}{\sqrt{1 + f_p^2/f_o^2}}\right) \cdot \frac{I_s^{ss} I_p^m}{I_p^{ss2}}$$

$$\frac{|N_2(f_s)|}{N_2^{ss}} \approx \left(\frac{\sigma_s^a}{\sigma_p^a} - \frac{\sigma_s^e + \sigma_s^a}{\sigma_p^e + \sigma_p^a}\right) \cdot \frac{\nu_p}{\nu_s} \cdot \left(\frac{1}{\sqrt{1 + f_p^2/f_o^2}}\right) \cdot \frac{I_s^m}{I_p^{ss}} \tag{15}$$

where:

$$f_o = \frac{\sigma_p^e + \sigma_p^a}{h\nu_p}I_p^{ss} + \frac{\sigma_s^e + \sigma_s^a}{h\nu_s}I_s^{ss} + \frac{1}{\tau_2} \approx \frac{\sigma_p^e + \sigma_p^a}{h\nu_p}I_p^{ss} \tag{16}$$

when $I_p^{ss} \gg I_s^{ss}$.

If it is assumed that $\lambda_p = 1480$ nm, $\lambda_s = 1550$ nm, and $I_p^{ss} = 1$ W, and if typical erbium-silica cross sections are assumed, then Equations 14 and 15 simplify to:

$$\frac{|N_2(f_p)|}{N_2^{ss}} \approx \left(\frac{0.9}{\sqrt{1 + f_p^2/4.3\,\text{kHz}}}\right) \cdot \frac{I_s^{ss} I_p^m}{I_p^{ss2}} \tag{17}$$

$$\frac{|N_2(f_s)|}{N_2^{ss}} \approx \left(\frac{1.2}{\sqrt{1 + f_s^2/4.3\,\text{kHz}}}\right) \cdot \frac{I_s^m}{I_p^{ss}}. \tag{18}$$

The pump-induced population inversion fluctuations (Equation 17) will be analyzed first. If $I_s^{ss} = 1$ mW, $I_p^{ss} = 1$ W, and it is assumed that $I_p^m/I_p^{ss} = 10^{-6}/\sqrt{\text{Hz}}$ (120 dB/$\sqrt{\text{Hz}}$ electronic SNR), then $|N_2(f_p)|/N_2^{ss} = 9 \times 10^{-10}$ $\sqrt{\text{Hz}}^{-1}$ at frequencies well below 4.3 kHz. In order to convert this figure to a phase modulation, the fact that 10 mW of pump power absorbed in an erbium-doped fiber induces approximately 7 radians of phase shift at 1550 nm can be used. (See, for example, M. J. F. Digonnet, et al., Resonantly Enhanced Nonlinearity in Doped Fibers for Low-Power All-Optical Switching: A Review, OPTICAL FIBER TECHNOLOGY, Vol. 3, No. 1, January 1997, pp. 44–64.) Using simulations, 10 mW of absorbed pump power in a typical erbium-doped fiber provides approximately 6 dB of small signal gain at 1550 nm, which is close to the gain required by each amplifier in an array with distributed EDFAs. (See, for example, Craig W. Hodgson, et al., Optimization of Large-Scale Fiber Sensor Arrays Incorporating Multiple Optical Amplifiers-Part I: Signal-to-Noise Ratio; Craig W. Hodgson, et al., Optimization of Large-Scale Fiber Sensor Arrays Incorporating Multiple Optical Amplifiers-Part II: Pump Power; Jefferson L. Wagener; et al., Novel Fiber Sensor Arrays Using Erbium-Doped Fiber Amplifiers; and C. W. Hodgson, et al., Large-scale interferometric fiber sensor arrays with multiple optical amplifiers, cited above.) Therefore, each amplifier provides approximately 7 radians of DC phase shift. Since the nonlinear phase shift is proportional to the upper state population, $N_2$, it can be written that $\Delta N_2/N_2^{ss} = \Delta\phi/\phi^{ss}$. Using this relation and Equation 17 again for $I_s^{ss}=1$ mW, $I_p^{ss}=1$ W, $I_p^m I_p^{ss} = 10^{-6}/\sqrt{Hz}$ and $f_s << 4.3$ kHz, the low-frequency phase noise induced by each EDFA is (7 radians)$\times(9\times10^{-10})$ $\sqrt{Hz}^{-1} = 6.3\times10^{-9}$ rad/$\sqrt{Hz}$. If it is assumed that there are a total of 500 such amplifiers and that the phase modulations from all 500 amplifiers add coherently, the total pump noise induced phase shift can be estimated to be 3.2 $\mu$rad/$\sqrt{Hz}$. The target phase noise floor is typically set to 1 $\mu$rad/$\sqrt{Hz}$, indicating that the nonlinear phase-noise induced by the EDFAs due to pump power fluctuations is close to but not significantly larger than the required phase noise floor. In practice, the amplifiers' phase modulations will not add coherently, which will reduce the 3.21 $\mu$rad/$\sqrt{Hz}$ figure.

Calculations of the induced phase shift due to signal power fluctuations are more complicated because the signal power not only has intensity noise but is also modulated by the multiplexing scheme. Again considering the TDM case, in general, while a given pulse is traveling through a particular EDFA, there may or may not be a counter-propagating pulse traveling through that EDFA at the same time. Taking the worst case in which there is always a counter-propagating pulse, $I_s^m$ is twice the intensity noise of each individual pulse. For the amplifiers, $I_s^m$ is typically 1.5 to 2 times the intensity noise of each individual pulse. Assuming the signal light has an electronic SNR of 120 dB/$\sqrt{Hz}$ at acoustic frequencies (i.e., $I_s^m/I_s^{ss}=10^{-6}/\sqrt{Hz}$), and inserting this figure into Equation 18 along with $I_p^{ss}=1$ W and $I_s^m=2$ mW, it can be calculated that $|N_2(f_s)|/N_2^{ss}$ is approximately $2.4\times10^{-9}$ $\sqrt{Hz}^{-1}$ at frequencies much lower than 4.3 kHz and that the phase noise induced by signal intensity noise in each EDFA is thus $1.68\times10^{-8}$ rad/$\sqrt{Hz}$. Again assuming 500 amplifiers and coherent addition of all EDFA-induced phase modulation, the total EDFA induced phase noise on each pulse is 8.4 $\mu$rad/$\sqrt{Hz}$, a level which could again limit the performance of the Sagnac sensor array. However, a more detailed study taking into account the multiplexing scheme and exact timing of the array is needed for a more accurate calculation.

Multiplexing Schemes in a Sagnac array

Time-Division Multiplexing

It has been assumed thus far that the Sagnac sensor array is operated in a TDM configuration. It should be noted that, in the Sagnac sensor array, the source requirements for such a TDM system are not as demanding as those of a Mach-Zehnder interferometric sensor array in a TDM configuration. The reason for this is the use of the broadband source in the Sagnac sensor array. In the Mach-Zehnder interferometric sensor array, the light from adjacent rungs is coherent due to the narrow linewidth source, and thus extremely high extinction ratios on the input pulse are required to prevent multi-path coherent interference. These high extinction ratio requirements are achieved by placing multiple modulators in series, which results in a complicated, high loss, and expensive source. In the Sagnac sensor array, the required extinction ratio need not be as high because the broadband source eliminates any possibility of multi-path coherent interference. In addition, the narrow linewidths required by the Mach-Zehnder interferometric sensor array prevent the use of a pulsed laser source in place of a continuous wave (cw) laser source which is externally modulated with Lithium Niobate intensity modulators. In the Sagnac sensor array, either a continuous-wave ASE source which is externally modulated, a pulsed ASE source, or some combination thereof could be used to construct the source. Again, the reason for this is that the Sagnac sensor array does not require a narrow linewidth source. Although the present invention does not require a narrow linewidth source, it should be understood that the Sagnac sensor array of the present invention can be used with a narrow linewidth source, such as, for example, a laser.

Frequency Division Multiplexing

Figure 14:
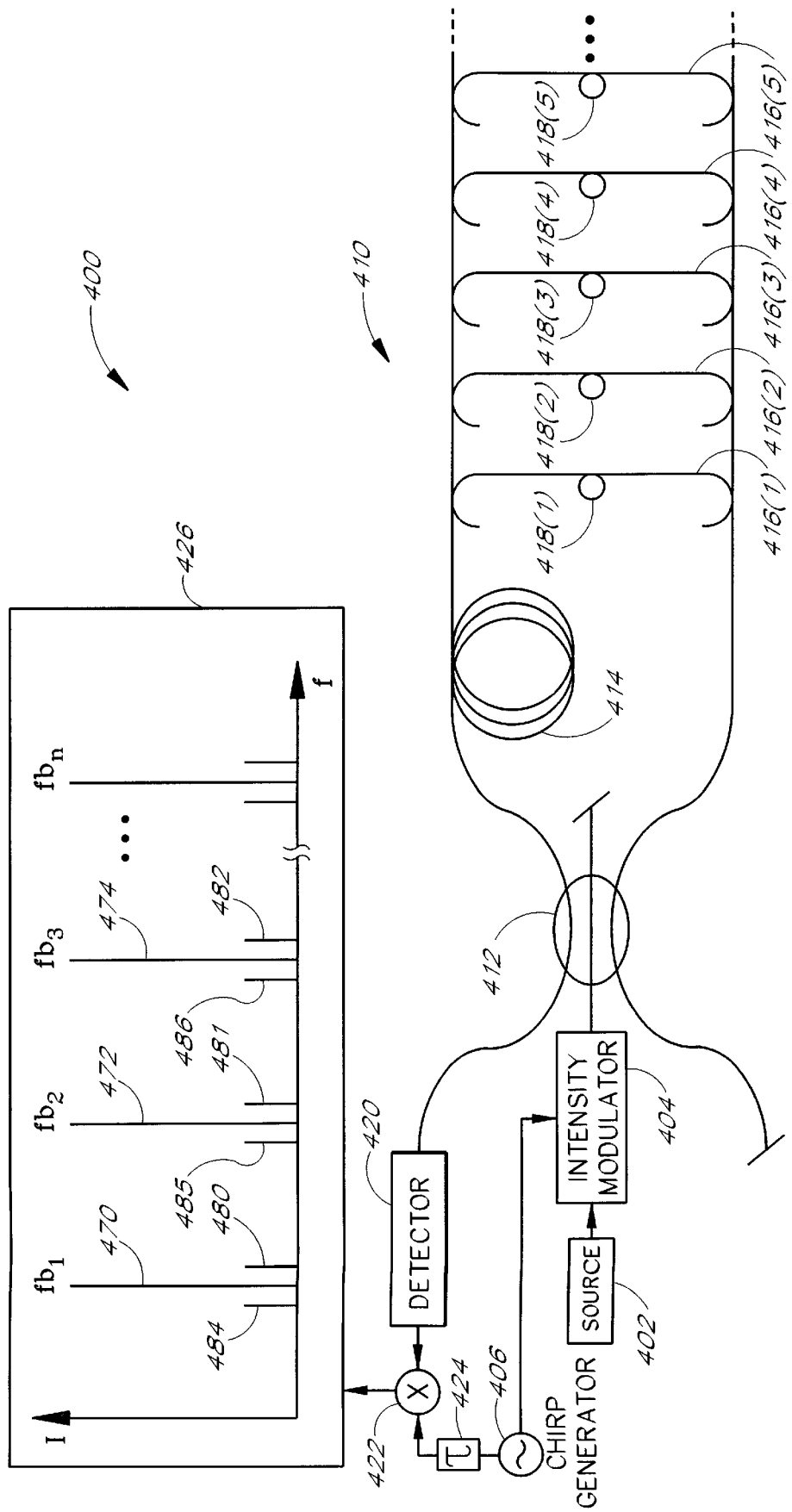
FIG. 14 illustrates a Sagnac interferometer which utilizes frequency divisional multiplexing.

The use of the broadband source also allows the Sagnac sensor array to operate in non-TDM configurations without changing the design or requiring additional sources. Frequency division multiplexing (FDM) is commonly used with Mach-Zehnder interferometric sensor arrays using the Phase-Generated Carrier (PGC) scheme but is also compatible with the Sagnac sensor array. FIG. 14 shows a basic Sagnac sensor array 400 using a FDM scheme. A fiber superfluorescent source (SFS) 402 (or other broadband source, such as, for example, an LED) generates input light. A chirped intensity modulation is applied to the input light via an intensity modulator 404 which is controlled by a chirped frequency generator 406. The modulated light enters a sensor array 410 via a 3×3 coupler 412. The light passes through a delay loop 414 and plural sensing rungs 416(*i*) having respective sensors 418(*i*). Empty rungs (not shown) can also be included if desired. After passing through the delay loop 414 and the rungs 416(*i*), the light exits from the sensor array 410 through the coupler 412 and is detected by a detector 420 which generates an electrical output signal responsive to the detected light. The electrical output signal from the detector 420 is mixed in a mixer 422 with the same chirped frequency which has been time delayed by a delay 424 which delays the chirped frequency by a time $\Delta t$. In the setup illustrated in FIG. 14, the output of the mixer 422 is applied to a spectrum analyzer 426. In an operational embodiment, the output of the mixer 422 is applied to a signal processing subsystem (not shown) which analyzes the output of the mixer 422 to reproduce the acoustic signals impinging on the array 410.

Figure 15:
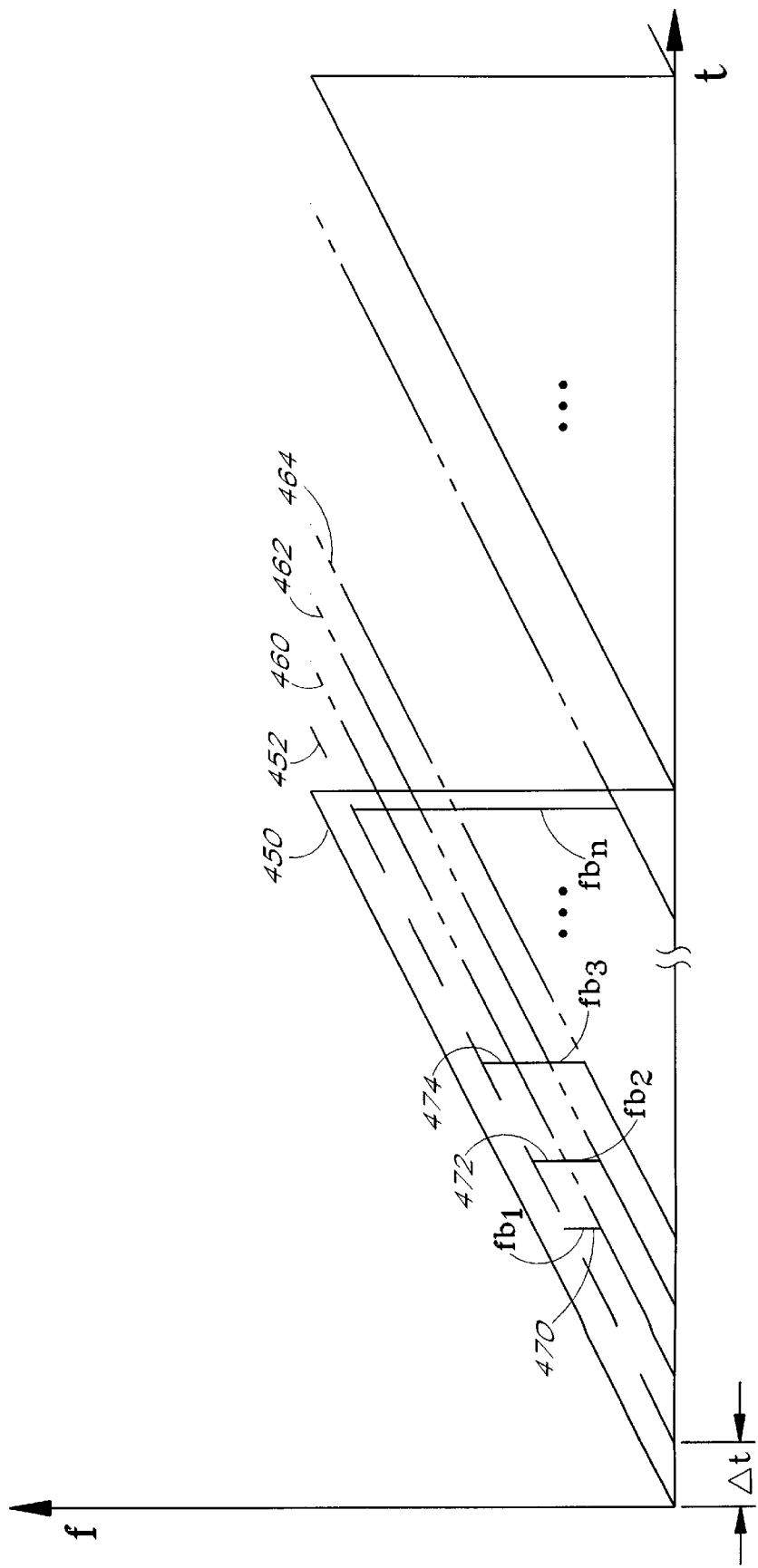
FIG. 15 illustrates a graph which shows the generation of the beat signals between the delayed modulation signal and the returning sensor signals in the interferometer of FIG. 14.

The signals returning from the sensors 418(*i*) in the various rungs 416(*i*) are further delayed with respect to the delayed chirp frequency. This is illustrated by the graphs in FIG. 15 by the original chirped frequency 450, the delayed chirped frequency 452 from the delay 424, the chirped return signal 460 from the first rung, the chirped return signal 462 from the second rung and the chirped return signal 464 from the third rung. In the mixer 422, separate beat frequencies $f_{b_1}$ 470, $f_{b_2}$ 472, $f_{b_3}$ 474, respectively (shown in FIG. 14), are formed between the mixing chirped frequency 452 and each of the signals returning from the various rungs in the Sagnac sensor array 410. (See, for example, S. F. Collins, et al., A Multiplexing Scheme For Optical Fiber Interferometric Sensors Using An FMCW Generated Carrier, *OFS '92 Conference* Proceedings, pp. 209–211.) Although only three chirped return signals 460, 462, 464 are illustrated in FIG.

15, it is contemplated that up to N return signals can be provided, where N is the number of rungs in the array 410. The chirped return signals from the Nth rung causes a beat frequency $f_{bN}$ in the mixer 422.

As illustrated by a pictorial representation of a spectral output in FIG. 14, acoustic modulation of the signals will appear as upper sidebands 480, 481, 482 and lower sidebands 484, 485, 486 to the beat frequencies. An advantage of this FDM scheme is that the demands on the array timing are greatly relaxed over those required in a TDM system. A TDM system requires a specific delay between adjacent rungs in order to prevent pulses from overlapping, and this can present a demanding engineering problem. In FDM, variations in fiber lengths shift beat frequencies but do not induce overlap between signals as long as these beat frequencies are separated by twice the acoustic detection range. The latter is accomplished by selecting the proper chirp rate. Unlike in a TDM system, all paths return light at all times, which can result in phase noise between the different incoherent signals. The broadband ASE light source minimizes the magnitude of this phase noise. (See, for example, Moslehi, Analysis of Optical Phase Noise in Fiber-Optic Systems Employing a Laser Source with Arbitrary Coherence Time, *Journal of Lightwave Technology, Vol. LT*-4, No. 9, September 1986, pp. 1334–1351.)

Code Division Multiplexing

Figure 16:
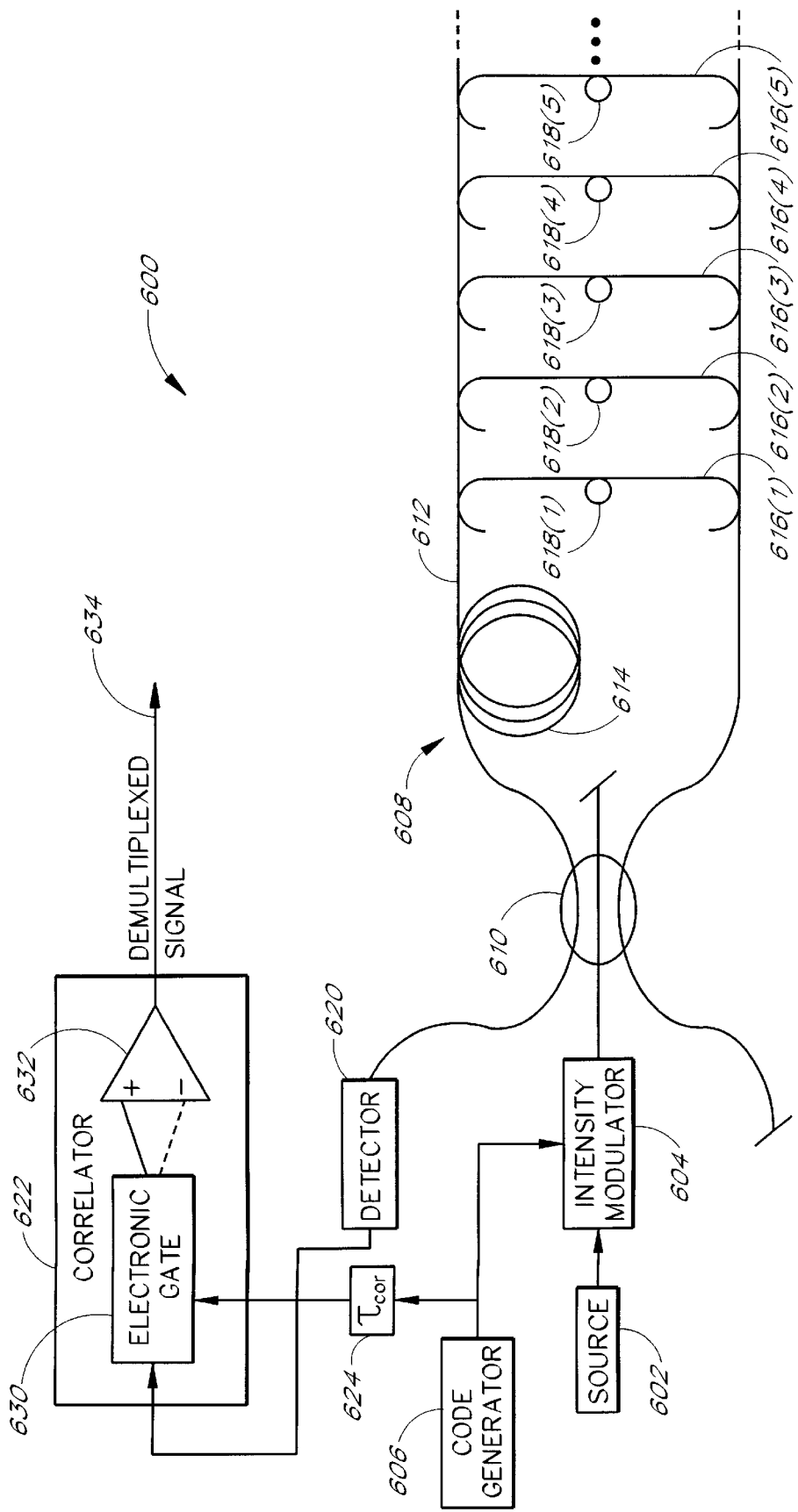
FIG. 16 illustrates a Sagnac interferometer which utilizes code division multiplexing.

Cod(e division multiplexing (CDM) has received increased attention lately for its use in sensor arrays. (See, for example, A. D. Kersey, et al., Code-division Multiplexed Interferometric Array With Phase Noise Reduction And Low Crosstalk, *OFS '92 Conference Proceedings*, pp. 266–269; and H. S. Al-Raweshidy, et al., Spread spectrum technique for passive multiplexing of interferometric optical fibre sensors, *SPIE*, Vol. 1314 Fiber Optics '90, pp. 342–347.) As illustrated for a Sagnac sensor array 600 in FIG. 16, in CDM, the input light from a fiber superfluorescent source 602 (or other broadband source, such as, for example, an LED) is modulated in an intensity modulator 604 according to a pseudo-random code generated by a code generator 606. The modulated light is applied to an interferometric loop 608 via a 3×3 coupler 610 and propagates through a delay loop 614 and a plurality of rungs 616($i$) in an array 612. In the illustrated embodiment, each rung 616($i$) includes a respective sensor 618($i$). Empty rungs (not shown) can also be included if desired. The light returns from the loop via the 3×3 coupler 610 and is detected by a detector 620. The electrical output of the detector 620 is applied to a correlator 622 along with the output of the code generator 606, which output is delayed for a duration $T_{cor}$ by a delay 624. The bit duration of the pseudo-random code is shorter than the propagation delay between adjacent rungs in the array 612. When $\tau_{cor}$ is equal to one of the loop travel times $\tau_i$, through a respective rung 616($i$), then the signal returning from this sensor in the rung 616($i$) is correlated to the delayed pseudo-random code. The other signals, which have delays $\tau_j$ where $|\tau_j - \tau_i| > \tau_{bit}$ correlate to zero. The correlation process involves, for example, multiplying the detected signal by 1 or −1 (or gating the signal in an electronic gate 630 to the non-inverting and inverting inputs of a differential amplifier 632) depending on whether the correlating code is on or off. The output of the differential amplifier on a line 634 is the correlated output. The signal is then time averaged over a period $t_{avg}$ equal to the duration of the code. The uncorrelated signals time average to zero, thereby isolating the signal from sensor 618($i$). $\tau_{cor}$ is scanned to retrieve sequentially the signals from all sensors.

An advantage of CDM over TDM is that the delay between sensors does not have to be controlled accurately. Any loop delays $\tau_j$ in which $|\tau_j - \tau_j \pm 1| > \tau_{bit}$ is acceptable (where $\tau_{bit}$ is the duration of a pulse in the code). Correlating requires a knowledge of the $\tau_j$'s, which are easily measured. As with FDM, the use of a broadband source benefits reducing the phase noise which results from the addition of all the signals together.

The foregoing described a novel design for an acoustic sensor array based on the Sagnac interferometer. The major advantages of this design are the use of common-path interferometers. This eliminates the conversion of source phase noise into intensity noise, which is prevalent in Mach-Zehnder interferometric sensors, and allows the use of a cheap, high-power ASE source or other broadband source. The response of the Sagnac sensor array as a function of acoustic frequency is shown to match the ocean noise floor. The design also allows the dynamic range to be dramatically increased without adding hydrophones by using one additional, very short delay loop. A technique for eliminating polarization-induced signal fading was discussed above. The Sagnac sensor array also allows the use of several multiplexing schemes in a simpler form than is achievable with a standard Mach-Zehnder array. Because of these features, the Sagnac sensor array design provides a very promising alternative to Mach-Zehnder-interferometer-based sensor arrays.

Although described above in connection with particular embodiments of the present invention, it should be understood the descriptions of the embodiments are illustrative of the invention and are not intended to be limiting. Various modifications and applications may occur to those skilled in the art without departing from the true spirit and scope of the invention as defined in the appended claims.

What is claimed is:

1. An acoustic sensor system comprising:
   a source of light;
   a coupler which receives said light from said source and which couples a first portion of said light to a first coupler port and which couples a second portion of said light to a second coupler port;
   an interferometric loop having a first end coupled to said first coupler port to receive said first portion of said light and having a second end coupled to said second coupler port to receive said second portion of said light, said interferometric loop propagating said first portion of said light in a first direction to said second coupler port, said interferometric loop propagating said second portion of said light in a second direction opposite said first direction to said first coupler port, said interferometric loop comprising:
   a delay portion of said interferometric loop, said delay portion having a first end proximate to said first end of said interferometric loop and having a second end, said delay portion providing a time delay for light passing through said delay portion from said first end of said delay portion to said second end of said delay portion and for light passing through said delay portion from said second end of said delay portion to said first end of said delay portion; and
   an array having a first end coupled to said second end of said delay portion and having a second end coupled to said second end of said loop, said array comprising:
   at least a first acoustic sensor and a second acoustic sensor coupled between said first end of said array and said second end of said array, said second acoustic sensor being disposed farther from said second end of said delay portion and farther from said second end of said loop than said first acoustic sensor to cause said second acoustic sensor to receive light after said first acoustic sensor, said first acoustic sensor and said second acoustic sensor being responsive to an impinging acoustic signal to modulate light passing therethrough in said first and second directions;

and at least one detector which receives light returned to said coupler from said interferometric loop, said detector detecting light phase modulated by said first acoustic sensor at a first time and detecting light phase modulated by said second acoustic sensor at a second time after said first time, said detector generating a detector output signal.

2. The acoustic sensor system as defined in claim 1, wherein said delay portion is a first delay portion, said acoustic sensor system further including a second delay portion, said second delay portion being coupled to said interferometric loop such that only a portion of said light propagates through said second delay portion, said second delay portion causing each of said first and second sensors to propagate light delayed by only said first delay portion and also to propagate light delayed by both said first delay portion and said second delay portion, said detector thereby receiving at least two pairs of interfering signals from each of said first and second sensors.

3. The acoustic sensor system as defined in claim 1, further including a plurality of amplifiers interposed in said array to compensate for losses caused by splitting said light between said first and second sensors.

4. The acoustic sensor as defined in claim 1, wherein said coupler is a 3×3 coupler.

5. The acoustic sensor as defined in claim 1, wherein said source of light is a broadband source.

6. The acoustic sensor as defined in claim 5, wherein said broadband source is a superfluorescent fiber source.

7. The acoustic sensor system as defined in claim 1, wherein said light modulated by said first acoustic sensor is separated from said light modulated by said second acoustic sensor by time division multiplexing.

8. The acoustic sensor system as defined in claim 1, further including:

a generator which generates a chirped frequency;

an intensity modulator which modulates said light from said light source with said chirped frequency;

an electronic delay which receives said chirped frequency and generates a delayed chirp frequency; and an electronic mixer which mixes said detector output signal and said delayed chirped frequency to produce a respective beat frequency corresponding to each of said first and second acoustic sensors, each beat frequency having respective sidebands corresponding to a respective acoustic signal detected by said respective first and second acoustic sensors.

9. The acoustic sensor system as defined in claim 1, further including:

a code generator which generates a digital code;

an intensity modulator which modulates said light from said light source with said digital code;

an electronic delay which applies a selected delay to said digital code to generate a delayed digital code; and a correlator which correlates said detector output signal and said digital code to produce a demultiplexed signal corresponding to an acoustic signal sensed by a selected one of said first and second acoustic sensors, said selected one of said first and second sensors being selected by said selected delay.

10. The acoustic sensor system as defined in claim 1, further including a depolarizer in said interferometric loop.

11. A Sagnac interferometric sensing system comprising:

a first Sagnac interferometer comprising:

a source of light;

a coupler which couples said light to a first coupler port and a second coupler port;

an optical path which couples light from said first coupler port to said second coupler port and from said second coupler port to said first coupler port, said optical path comprising:

a delay portion proximate to said first coupler port, said delay portion providing a time delay for light propagating through said delay portion from a first end of said delay portion to a second end of said delay portion and also providing said time delay for light propagating through said delay portion from said second end of said delay portion to said first end of said delay portion; and a first acoustic sensor coupled between said second end of said delay portion and said second port of said coupler, said first acoustic sensor propagating a first light signal from said second end of said delay portion to said second coupler port and propagating a second light signal from said second coupler port to said second end of said delay portion, said first acoustic sensor being responsive to an impinging acoustic signal to modulate the first and second light signals, said second light signal being delayed in said delay portion to cause said second light signal to arrive at said first port of said coupler at the same time as said second light signal arrives at said second port of said coupler, said first light signal and said second light signal interfering at said coupler to generate a first interferometer output signal; and a detector coupled to receive said first interferometer output signal;

and a second Sagnac interferometer, comprising:

said source of light;

said coupler;

said optical path;

said delay portion;

said detector; and a second acoustic sensor coupled between said second end of said delay portion and said second port of said coupler, said second acoustic sensor being displaced from said second end of said delay portion and from said second port of said coupler to cause said second acoustic sensor to couple a third light signal from said second end of said delay portion to said second port of said coupler after said first light signal is coupled to said second port of said coupler and to cause said acoustic sensor to couple a fourth light signal from said second port of said coupler to said second end of said delay portion after said second light signal is coupled to said second end of said delay portion, said fourth light signal being delayed in said delay portion to arrive at said first port of said coupler at the same time as said third light signal arrives at said second port of said coupler, said third and fourth light signal interfering in said coupler to generate a second interferometric output signal which is detected by said detector after said first interferometric light signal is detected by said detector.

12. The Sagnac interferometric sensing system as defined in claim 11, wherein said delay portion is a first delay portion, said Sagnac interferometric sensing system further including a second delay portion, said second delay portion being coupled to said first delay portion such that only a portion of said light propagates through said second delay portion, said second delay portion causing each of said first and second acoustic sensors to propagate light delayed by only said first delay portion and to also propagate light delayed by both said first delay portion and said second delay portion, said detector thereby receiving at least two pairs of interfering signals from each of said first and second acoustic sensors.

13. The Sagnac interferometric sensing system as defined in claim 11, further including a plurality of amplifiers interposed proximate to said first and second acoustic sensors to compensate for losses caused by splitting said light between said first and second sensors.

14. The Sagnac interferometric sensing system as defined in claim 11, wherein said light modulated by said first acoustic sensor is separated from said light modulated by said second acoustic sensor by time division multiplexing.

15. The Sagnac interferometric sensing system as defined in claim 11, further including:
a generator which generates a chirped frequency;
an intensity modulator which modulates said light from said source of light with said chirped frequency;
an electronic delay which receives said chirped frequency and generates a delayed chirp frequency; and
a mixer which mixes said detector output signal and said delayed chirped frequency to produce a respective beat frequency corresponding to each of said first and second acoustic sensors, each beat frequency having respective sidebands corresponding to a respective acoustic signal detected by said respective first and second acoustic sensors.

16. The Sagnac interferometric sensing system as defined in claim 11, further including:
a code generator which generates a digital code;
an intensity modulator which modulates said light from said light source with said digital code;
an electronic delay which applies a selected delay to said digital code to generate a delayed digital code; and
a correlator which correlates said detector output signal and said digital code to produce a demultiplexed signal corresponding to an acoustic signal sensed by a selected one of said first and second sensors, said selected one of said first and second acoustic sensors being selected in by said selected delay.

17. The Sagnac interferometric sensing system as defined in claim 11, further including a depolarizer in said optical path.

18. The Sagnac interferometric sensing system as defined in claim 11 wherein said coupler is a 3×3 coupler.

19. The Sagnac interferometric sensing system as defined in claim 11, wherein said source of light is a broadband source.

20. The Sagnac interferometric sensing system as defined in claim 19, wherein said broadband source is a superfluorescent fiber source.

21. The Sagnac interferometric sensing system as defined in claim 11, wherein said source of light generates light as a series of pulses.

22. A sensing apparatus comprising:
a source of light;
an optical coupler which receives said light and couples said light to a first coupler port and a second coupler port;
an optical fiber loop, comprising:
a first end coupled to receive light from said first coupler port and a second end coupled to receive light from said second coupler port, said light from said first coupler port propagating in a first direction in said loop to said second coupler port, said light from said second coupler port propagating in a second direction in said loop to said first coupler port;
a sensor array comprising a plurality of sensors, each sensor receiving a respective portion of said light propagating in said first direction in said loop and a respective portion of said light propagating in said second direction in said loop, each of said sensors having a different optical path length such that said respective portions of light propagate through a first one of said sensors before said respective portions of light propagate through a second one of said sensors; and
a delay portion in said loop, said delay portion positioned optically closer to said first end of said loop than to said second end of said loop to cause light propagating in said first direction to propagate through said delay portion and then through said sensor array and to cause light propagating in said second direction to propagate through said sensor array and then through said delay portion.

23. The sensing apparatus as defined in claim 22, wherein said delay portion is a first delay portion, said sensing apparatus further including a second delay portion, said second delay portion being coupled to said first delay portion such that only a portion of said light propagates through said second delay portion, said second delay portion causing each of said first and second sensors to propagate light delayed by only said first delay portion and to also propagate light delayed by both said first delay portion and said second delay portion.

24. The sensing apparatus as defined in claim 22, further including a plurality of amplifiers interposed proximate to said first and second sensors to compensate for losses caused by splitting said light between said first and second sensors.

25. The sensing apparatus as defined in claim 22, wherein said light modulated by said first sensor is separated from said light modulated by said second sensor by time division multiplexing.

26. The sensing apparatus as defined in claim 22, further including:
a detector which receives light output from said loop via said optical coupler and which generates a detector output signal;
a generator which generates a chirped frequency;
an intensity modulator which modulates said light from said source of light with said chirped frequency;
an electronic delay which receives said chirped frequency and generates a delayed chirp frequency; and
a mixer which mixes said detector output signal and said delayed chirped frequency to produce a respective beat frequency corresponding to each of said first and second sensors, each beat frequency having respective sidebands corresponding to a respective signal detected by said respective first and second sensors.

27. The sensing apparatus as defined in claim 22, further including:
- a detector which receives light output from said loop via said optical coupler and which generates a detector output signal;
- a code generator which generates a digital code;
- an intensity modulator which modulates said light from said light source with said digital code;
- an electronic delay which applies a selected delay to said digital code to generate a delayed digital code; and
- a correlator which correlates said detector output signal and said digital code to produce a demultiplexed signal corresponding to a signal sensed by a selected one of said first and second sensors, said selected one of said first and second sensors being selected in by said selected delay.

28. The sensing apparatus as defined in claim 22, further including a depolarizer in said optical fiber loop.

29. The sensing apparatus as defined in claim 22, wherein said source of light generates light in pulses.

30. A method of sensing a parameter comprising:
- propagating light from a source of light through a loop such that respective portions of said light counterpropagate in first and second directions in said loop;
- passing said light propagating in said loop through at least first and second sensors which are responsive to the parameter being sensed to modulate the light passing therethrough, said first and second sensors having different optical path lengths such that light passing through said second sensor is delayed with respect to light passing through said first sensor;
- delaying said light propagating in said loop in said first direction before said light propagating in said first direction passes through said first and second sensors;
- delaying said light propagating in said loop in said second direction after said light propagating in said second direction passes through said first and second sensors; and
- interfering said light propagating in said first and second directions to generate a first output signal responsive to light passing through said first sensor in said first and second directions and to generate a second output signal responsive to light passing through said second sensor in said first and second directions, said second output signal delayed with respect to said first output signal.

31. The method of sensing as defined in claim 30, wherein said delaying steps provide a first time delay for a first portion of said light, said method further including the step of delaying a second portion of said light by a second time delay.

32. The method of sensing as defined in claim 30, further including amplifying light propagating through said first and second sensors to compensate for losses caused by splitting said light between said first and second sensors.

33. The method of sensing apparatus as defined in claim 30, wherein said light from said source of light is pulsed, and said light modulated by said first sensor is separated from said light modulated by said second sensor by time division multiplexing.

34. The method of sensing as defined in claim 30, further including:
- detecting said first and second output signals;
- generating a chirped frequency;
- modulating said light from said source of light with said chirped frequency;
- delaying said chirped frequency to generate a delayed chirp frequency; and
- mixing said detector output signal and said delayed chirped frequency to produce a respective beat frequency corresponding to each of said first and second sensors, each beat frequency having respective sidebands corresponding to the respective parameter detected by said respective first and second sensors.

35. The method of sensing as defined in claim 30, further including:
- detecting said first and second output signals;
- generating a digital code;
- intensity modulating said light from said light source with said digital code;
- applying a selected delay to said digital code to generate a delayed digital code; and
- correlating said detector output signal and said digital code to produce a demultiplexed signal corresponding to the parameter sensed by a selected one of said first and second sensors, said selected one of said first and second sensors being selected in by said selected delay.

36. The method of sensing as defined in claim 30, further including depolarizing the light propagating in said loop.

37. A sensing apparatus comprising:
- a coupler which receives light from an optical source and couples first and second portions of said light to first and second coupler ports;
- an optical loop connected between said first and second coupler ports to propagate light from said first coupler port to said second coupler port through said loop in a first direction and to propagate light from said second coupler port to said first coupler port in a second direction, said light propagating in said first and second directions being combined in said coupler;
- a sensor array comprising at least first and second sensors which sense a parameter, said first and second sensors having respective first and second optical paths, said first optical path through said first sensor being optically shorter than said second optical path through said second sensor; and
- an optical delay portion positioned in said loop, said delay portion positioned in said loop between said sensor array and said first coupler port to cause light propagating from said first coupler port in said first direction to be delayed by said optical delay portion before reaching said sensor array and to cause light propagating from said second coupler port in said second direction to be delayed by said optical delay portion after passing through said sensor array.

38. The sensing apparatus as defined in claim 37, wherein said optical delay portion is a first optical delay portion, said sensing apparatus further including a second optical delay portion, said second optical delay portion being coupled to said first optical delay portion such that only a portion of said light propagates through said second optical delay portion, said second optical delay portion causing each of said first and second sensors to propagate light delayed by only said first optical delay portion and to also propagate light delayed by both said first optical delay portion and said second optical delay portion.

39. The sensing apparatus as defined in claim 37, further including a plurality of amplifiers interposed proximate to said first and second sensors to compensate for losses caused by splitting said light between said first and second sensors.

40. The sensing apparatus as defined in claim 37, wherein said light from said optical source is pulsed and said light modulated by said first sensor is separated from said light modulated by said second sensor by time division multiplexing.

41. The sensing apparatus as defined in claim 37, further including:
- a detector which receives light output from said optical loop via said coupler and which generates a detector output signal;
- a generator which generates a chirped frequency;
- an intensity modulator which modulates said light from said optical source with said chirped frequency;
- an electronic delay which receives said chirped frequency and generates a delayed chirp frequency; and
- a mixer which mixes said detector output signal and said delayed chirped frequency to produce a respective beat frequency corresponding to each of said first and second sensors, each beat frequency having respective sidebands corresponding to the respective parameter detected by said respective first and second sensors.

42. The sensing apparatus as defined in claim 37, further including:
- a detector which receives light output from said optical loop via said coupler and which generates a detector output signal;
- a code generator which generates a digital code;
- an intensity modulator which modulates said light from said light source with said digital code;
- an electronic delay which applies a selected delay to said digital code to generate a delayed digital code; and
- a correlator which correlates said detector output signal and said digital code to produce a demultiplexed signal corresponding to the parameter sensed by a selected one of said first and second sensors, said selected one of said first and second sensors being selected in by said selected delay.

43. The sensing apparatus as defined in claim 37, further including a depolarizer in said optical loop.

44. The sensing apparatus as defined in claim 37, further including a third optical path in said array, said third optical path propagating light therein, said third optical path having a different optical length than said first optical path and said second optical path, said third optical path being sensitive to distributed pick-up noise common to at least said first optical path, said third optical path producing a signal responsive to said distributed pick-up noise that is subtracted from a signal generated by said first optical path to remove the effect of distributed pick-up noise from said signal generated by said first optical path.

45. The sensing apparatus as defined in claim 37, further including third and fourth optical paths in said array, said third and fourth optical paths propagating light therein, said third optical path having a different optical length than said first optical path and said second optical path, said fourth optical path having a different optical length than said first, second and third optical paths, said third optical path being sensitive to distributed pick-up noise common to said first optical path, said third optical path producing a signal responsive to said distributed pick-up noise that is subtracted from a signal generated by said first optical path to remove the effect of distributed pick-up noise from said signal generated by said first optical path, said fourth optical path being sensitive to distributed pick-up noise common to said second optical path, said fourth optical path producing a signal responsive to said distributed pick-up noise that is subtracted from a signal generated by said second optical path to remove the effect of distributed pick-up noise from said signal generated by said second optical path.

46. The sensing apparatus of claim 37, further including first and second detectors coupled to receive light from said coupler after said light has propagated in said loop, said detectors generating respective first and second detector output signals which are processed to subtract source excess noise.

* * * * *